(12) United States Patent
Jaenisch et al.

(10) Patent No.: US 11,580,331 B2
(45) Date of Patent: Feb. 14, 2023

(54) CLASSIFICATION USING CASCADED SPATIAL VOTING GRIDS

(71) Applicant: Raytheon Company, Waltham, MA (US)

(72) Inventors: Holger M. Jaenisch, Toney, AL (US); James W. Handley, Toney, AL (US)

(73) Assignee: Raytheon Company, Waltham, MA (US)

( * ) Notice: Subject to any disclaimer, the term of this patent is extended or adjusted under 35 U.S.C. 154(b) by 621 days.

(21) Appl. No.: 16/664,408

(22) Filed: Oct. 25, 2019

(65) Prior Publication Data
US 2021/0124998 A1   Apr. 29, 2021

(51) Int. Cl.
| G06K 9/62 | (2022.01) |
| G06F 12/02 | (2006.01) |
| G06N 20/00 | (2019.01) |

(52) U.S. Cl.
CPC ....... *G06K 9/6257* (2013.01); *G06F 12/0207* (2013.01); *G06N 20/00* (2019.01)

(58) Field of Classification Search
CPC ............ G06F 12/0207; G06F 16/2264; G06K 9/6257; G06N 20/00
USPC ......................................................... 706/12
See application file for complete search history.

(56) References Cited

U.S. PATENT DOCUMENTS

| 7,328,206 B2 | 2/2008 | Petculescu et al. |
| 7,626,535 B2 | 12/2009 | Ding et al. |
| 7,741,992 B2 | 6/2010 | Wang et al. |
| 8,805,858 B1 * | 8/2014 | Ray .......................... G06F 16/29 707/754 |
| 9,157,992 B2 | 10/2015 | Wang et al. |
| 11,204,946 B2 * | 12/2021 | Mozaffari ............... G06F 16/26 |
| 2014/0162689 A1 | 6/2014 | Saldamli |
| 2015/0032723 A1 * | 1/2015 | Khanolkar ........ G06F 16/24542 707/718 |
| 2017/0011089 A1 * | 1/2017 | Bermudez Rodriguez .................. G06F 16/9537 |
| 2019/0279112 A1 * | 9/2019 | Jaenisch ................ G06K 9/629 |

FOREIGN PATENT DOCUMENTS

| WO | WO-2008098915 A1 | 8/2008 |
| WO | WO-2019198532 A1 | 10/2019 |
| WO | WO-2021080747 A1 | 4/2021 |

(Continued)

OTHER PUBLICATIONS

U.S. Appl. No. 17/278,135, filed Mar. 19, 2021, Object Tracking Using Spatial Voting.

(Continued)

*Primary Examiner* — Chun Kuan Lee
(74) *Attorney, Agent, or Firm* — Schwegman Lundberg & Woessner, P.A.

(57) ABSTRACT

A method can include identifying a first key value of a first cell of a first grid of grids of cells to which a first feature maps, embedding the first grid into each cell of a second grid, identifying a second key value of a second cell of the second grid to which a second feature maps, the second key value representative of the first and second key values, comparing the identified key value to the key values of a memory, in response to determining the identified key value is in the memory, and providing data indicating a class associated with the identified key value in the memory.

20 Claims, 23 Drawing Sheets

(56) References Cited

FOREIGN PATENT DOCUMENTS

WO    WO-2021230937 A2    11/2021
WO    WO-2021230937 A3    11/2021

OTHER PUBLICATIONS

"International Application Serial No. PCT/US2020/053254, International Search Report dated Dec. 9, 2020", 4 pgs.
"International Application Serial No. PCT/US2020/053254, Written Opinion dated Dec. 9, 2020", 7 pgs.
Fukunaga, K, et al., "The Estimation of the Gradient of a Density Function, with Applications in Pattern Recognition", IEEE Transactions On Information Theory, vol. IT-21, No. 1, (Jan. 1975), 32-40.
Magalhaes, Salles V. G, et al., "PinMesh-Fast and exact 3D point location queries using a uniform grid", Computers and Graphics, Elsevier, GB, vol. 58, (May 17, 2016), 1-11.
"International Application Serial No. PCT/US2021/018358, International Search Report dated Dec. 8, 2021", 4 pgs.
"International Application Serial No. PCT/US2021/018358, Written Opinion dated Dec. 8, 2021", 10 pgs.
"International Application Serial No. PCT/US2020/053254, International Preliminary Report on Patentability dated May 5, 2022", 9 pgs.

\* cited by examiner

|    | R0 | R1 | R2 | R3 | R4 | R5 | R6 | R7 | R8 |
|----|----|----|----|----|----|----|----|----|----|
| C8 | 0  | 0  | 0  | 0  | 0  | 0  | 0  | 0  | 0  |
| C7 | 0  | 1  | 1  | 1  | 0  | 0  | 1  | 1  | 0  |
| C6 | 0  | 0  | 0  | 0  | 0  | 0  | 0  | 0  | 0  |
| C5 | 0  | 0  | 0  | 0  | 0  | 0  | 0  | 0  | 0  |
| C4 | 0  | 1  | 1  | 1  | 1  | 1  | 1  | 1  | 0  |
| C3 | 1  | 1  | 1  | 1  | 1  | 1  | 1  | 1  | 1  |
| C2 | 0  | 0  | 0  | 0  | 0  | 1  | 0  | 0  | 0  |
| C1 | 0  | 0  | 0  | 0  | 0  | 0  | 0  | 0  | 0  |
| C0 | 0  | 0  | 0  | 0  | 0  | 0  | 0  | 0  | 0  |

FIG. 5

BEHAVIOR TRANSITION MATRIX

TO

| | GROUP 1 | GROUP 2 | GROUP 3 |
|---|---|---|---|
| GROUP 1 | 0.33 | 0.67 | 0 |
| GROUP 2 | 0.33 | 0.33 | 0.33 |
| GROUP 3 | 0 | 0 | 0 |

FROM

FIG. 10

CLASSIFICATION USING CASCADED SPATIAL VOTING GRIDS

TECHNICAL FIELD

Embodiments relate to classification using information theoretic (IT) techniques.

TECHNICAL BACKGROUND

Classification techniques are typically machine learning (ML) or artificial intelligence (AI) based techniques. These techniques, however, are all limited by the No Free Lunch (NFL) theorem and make the use of partial information problematic. The NFL theorem demonstrates that if a technique performs well on a certain class of problems, then it necessarily pays for that with degraded performance on the set of all remaining problems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates, by way of example, a diagram of an embodiment of an SV grid with 81 cells (9×9 grid of cells).

FIG. 10 illustrates, by way of example, a diagram of an embodiment of a behavior transition matrix.

DETAILED DESCRIPTION

Figure 1:
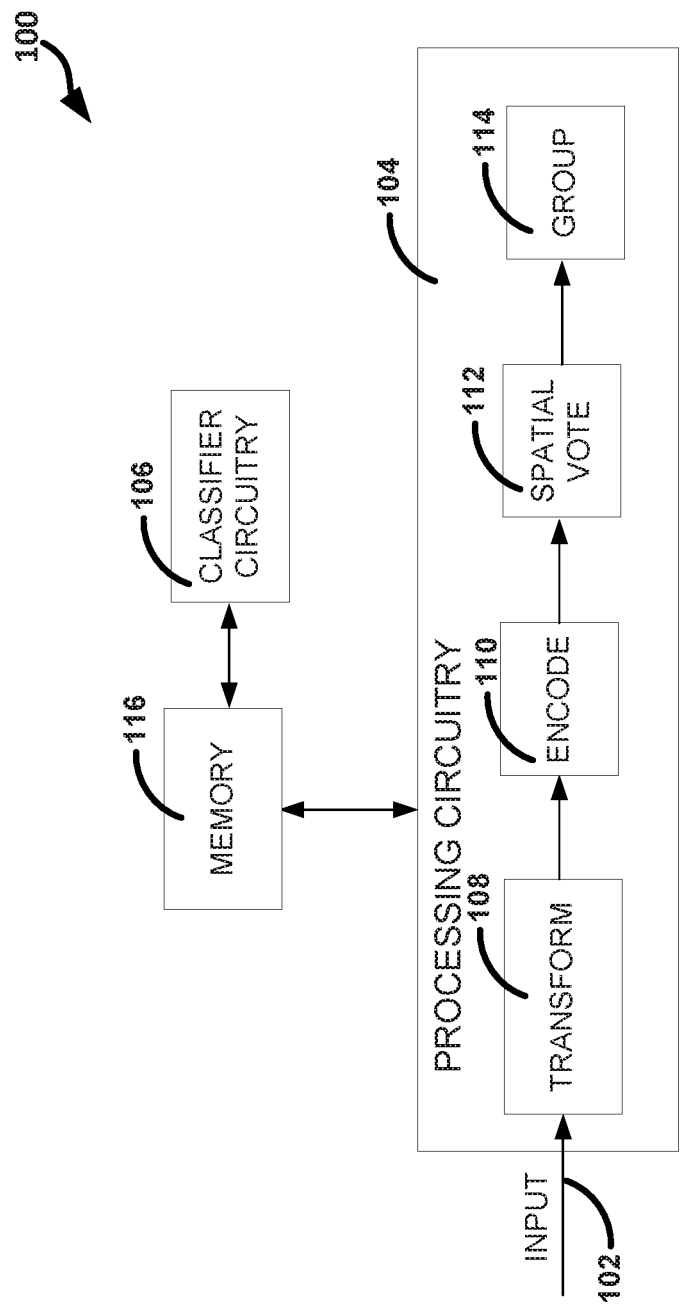
FIG. 1 illustrates, by way of example, a diagram of an embodiment of a system for anomaly detection.

Embodiments regard methods, systems, and apparatuses for instantiating a self-supervised, mathematically derived, convergent stopping criteria for resolving two or more data items as being related, or unique, within constraints of a measurement resolution of available features. Upon auto-self resolving into a set of data partitions, embodiments can use partial information on converged partitions. De-confliction of the converged partitions can be performed with a self-supervised, self-terminating, mathematically derived criterion of looking for pure labels within partitions (sometimes called "cells"). In both resolving and deconfliction, the need for supplying a priori thresholds criteria or bounding conditions is eliminated along with the use of an optimization strategy being used to discover stopping points. This makes embodiments free of the constraints of the No Free Lunch Theorem (NFL) limitations. Embodiment can thus provide a fully Information Theoretic Method (ITM) of self-aware discrimination of unknown data into partitions of "self" and "non-self" as well as the ability to label portions of such partitions with human provided labels without having to re-derive the initial partition. Embodiments can thus achieve the Machine Learning (ML) goal of Transfer Learning as well. Embodiments can retain the ability to detect and recognize unknown-unknown cases as "anomalies" while avoiding the pitfall of requiring confidences or probabilities of classification or similarity when data falls in partitions not created during an initial data sampling of running process.

Some embodiments relate to anomaly detection. An "anomaly", as used herein, means detected behavior not seen or experienced by the detection device before now. Embodiments can be agnostic to data type, format, source, or examples. Embodiments can be self-initializing, adaptive, and self-aware.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments can be embedded into firmware. Embodiments can be driven by sensor measurements including, but not limited to, voltages, currents, and any other physics-based parameters, as well as binary or digital data obtained from sensors or other nodes. Embodiments can use Information Theoretic Methods (ITM) to achieve compressive sensing encoding of data streams, files, sequences, packets, or a portion thereof that are order sensitive to the symbol sequence. The encoding can provide a hash-like function with nearness, removing external definitions of similarity, or a requirement for nearest neighbor calculations.

This disclosure uses for an illustrative use case, but is not limited to, cyber event or network data. The disclosure further illustrates how numeric encoding of data enables adaptive Spatial Voting (SV) grids and how the grids can be used to (automatically) detect a cyber-attack event.

Embodiments can use discrete mapping of a two-dimensional (2-D) scatter plot (sometimes called an SV grid) to establish a baseline pattern of populated grid cells that represents device behavior. Comparison can be achieved by calculating the grid cell assignment for a newly encoded data item, and testing if the cell index value already exists in a dictionary, lookup table (LUT), or run length encoding (RLE) of the SV grid. If it does, the data item is ignored as a minor variant of something previously encountered and a vote or stack count of a grid index (sometimes called a key value) can be incremented. However, if the proposed new grid key value does not already exist, the data item can be declared anomalous and can be recorded in an anomaly storage file and a new grid key added to the recognized key dictionary, LUT, or RLE.

Monitoring changes, such as across epochs, provides an ability to detect anomalies in a wide variety of situations. Applications can include packet or other data detection in a network (e.g., thumb drive insertion and the launch of a bot in the associated network, bus anomaly detection, corrupt packet detection and initialization when running simulations, finding packet fragments drift errors message types, or the like), device (e.g., helicopter, missile, airplane (e.g., associated 1553b system messaging and control bus, or the like), automotive vehicle (e.g., Controller Area Network (CAN bus) messaging, control busses, or the like), truck, radar, satellite, appliance, phone, computer, sensor, internet of things (TOT) device, embedded device, or the other manned or unmanned device), software or firmware based firewalls, black list/white list processes, malware or malicious behavior detection processes, surveillance systems including passive and active electromagnetic (EM) and non-EM based systems including large scale systems such as power generation facilities, manufacturing facilities, remote monitoring facilities and any operational system of systems that uses active or passive "controllers" as part of the operation and decision making process both with and without operation error detection (e.g., vibration fault detection, data fault detection, system configuration change detection, high priority alert thinning to relevant anomalies, query information variety discovery and unique information detection), natural language processing (NLP), entry matching such as in a maintenance log or other log (e.g., to directly associate entries about a same item or even when different technicians use different abbreviations or descriptions but are discussing a common symptom or part), matching job descriptions to resumes, text matching (e.g., finding documents that relate to search example of interest even if key words are absent), predicting time to failure (e.g., by monitoring how often new anomalies are detected as indication of system status change to a new or worse steady state), relevant detection of changes in scenes or video streams, such as full motion video real time feeds or isolating subset of frames from blurry movies or image streams enabling high resolution enhancement, such as for deep sky astronomy showing better performance than using adaptive optics as well as surveillance imagery, lossless compression of data extracting minimum relevant sub sample if data is sufficient for a secondary or tertiary decision making process, fusing multiple information sources to rapidly enable situation awareness such as in multi-intelligence (INT) scenarios, among others.

This disclosure describes an SV grid encoding process that reduces memory consumed by the SV grid. The disclosure further describes efficient methods of using the encoded SV grid data to determine whether a key value has been seen previously (is recognized or is an anomaly). Embodiments can provide an automated report. The report can be generated for an analyst. The report can isolate aspects of the behavior responsible for triggering the event along with confidence intervals and statistical tests of significance to isolate the behavior with relevant information.

Anomalies, as used herein, are defined as being "something never experienced before now". This definition inherently puts an order dependency or temporal component to the definition of anomaly.

Many devices, such as Internet of Things (IoT), or other devices are designed for form and thus have reduced memory resources available. Embodiments can allow for anomalous behavior detection in such devices. Thus, embodiments solve a problem of how to efficiently represent an SV grid in devices, such as embedded processors, with limited memory or primitive computational capability (e.g., controllers, such as peripheral interface controller (PIC), Arduino, Stamp, or other microcontroller). These embedded systems can be constrained with respect to processing power or memory usage. Using a matrix to represent the SV grid can be infeasible due to high memory use and potential reallocation of large chunks of memory. Hash tables can be infeasible since key values change when the SV grid changes in size, causing expensive table index recalculation. Embodiments can use an RLE of populated SV grid columns/rows. Such a representation requires only a finite number of tests to check for key existence. Such a representation provides an ability to operate in a fixed amount of memory regardless of how many new keys are discovered in the unbounded domain. As the number of keys grows, accumulated RLE info can be written into other processes for use on other nodes, such as to provide an inherited knowledge set.

A self-adapting SV grid can be enabled to auto adjust both its spatial extent and resolution. The adjustment can be driven by newly experienced encoded data. The first data item that creates a new grid cell "key value" can be identified. Any further data that encodes into an existing grid cell increases the stack count for the cell. These data can be deemed trivial variations of what has already been encountered. Such adaptive partitioning of data extracts relevant dynamic variants and yields what may be thought of as "margin points" or support vectors from support vector machine (SVM), but using an orthogonal and unrelated methodology. In some embodiments, no use of "truth" labels is made. In various embodiments, grouping and partitioning is done using information theory. Some embodiments can use encoded statistical estimators as (x, y) pairs that map to the SV grid. This is metaphorically similar to principal component 1 and principal component 2, but using none of the eigenvalue math/linear algebra principal component analysis (PCA) uses and obtaining the result in real-time. Various embodiments can be implemented on a multi-threaded process, such as in a distributed parallel fashion.

Reported events can include one or more anomalies. Runs of anomalies that fall more frequently outside a predicted area of regard region can signal a systemic persistent shift in observed system state and behavior, as opposed to intermittent spurious anomalies in recurring realms. These runs or individual anomalous operations can correspond to important behavior changes and can be alerted.

In literature, anomalies are synonymous with "bad behaviors". This is occurring in ML since, by definition, ML methods rely on "optimization strategies" to define decision boundaries and create classifiers with targeted "equal error rate". These ML methods are subject to the limitations of both Wolpert's No Free Lunch Theorem (NFL) and the Ugly Duckling Theorem. This is because ML classifiers measure differences and distinctions between two or more things. Whenever such a comparison is made it reduces mathematically to a set of ratios. For a given numerical value, there are an infinite number of numerator and denominator combinations that result in the same numerical equivalent value making the ratio concept non-unique. Thus, methods that require differencing require 2 or more classes to find differences and by definition cannot discover fundamental ab-initio traits that have a physics-based meaning. Hence the ability to learn only 1 class "normal" is intractable. Rather than admitting the in-admissibility of ML as method for detecting "anomalies", the ML community has attempted to cheat the math by taking what is normal and creating "artificial" data, to turn a single class case into a contrived two class case. The ML then proceeds by training. What is being learned is the differences between the normal data and the contrived data, which are very unlikely the same as the unknown-unknown data that has yet to be encountered, hence such classifiers when deployed suffer from at least two problems. These ML techniques make a class declaration (if 3 classes were trained on, one of the three will be declared no matter how unlikely they are, they simply report with a lower probability or confidence and the ML technique generally cannot return an "unknown" state). The need for confidences and probabilities leads to a third issue of having to set thresholds ad hoc and post hoc based on limited simulated testing and retesting upon failure. In all cases, a known equal error rate is minimized but specificity of one (e.g., no false positives) is not obtainable, hence it is known generally how many false positives to expect at best with no means of ferreting them out.

Truly detecting an unknown-unknown can include context that is created in-situ as data is processed and encountered, thus yielding experience. The process can then, upon organizing what has been seen into partitions of similar based on numeric binning, determine if the new data falls into an existing bin or not. If it does, it is not novel (it is recognized). If it does not, then it has never been encountered before and is an anomaly and worthy of further reconsideration in a post process or downstream inspection.

Some embodiments can include "self-aware" and fully adaptive processes. Self-awareness, as used herein, means defining self in terms of aggregate of experiences and an ability to discern a new stimulus as being either self or not self. This self-awareness eliminates traditional training and need for labeled data, it yields data thinning to relevant cases, and enables self-supervised classifiers and detectors to be created and employed upstream of itself, filter out with black/white list capability those things which have been encountered before to disregard them. The self-supervised classifier can generate labels of temporal group and key index values. The labels can be replaced with human interpretable grammar without requiring any change in the defined groupings and encoded mappings into such groups.

Embodiments can make a determination much faster than a k-means clustering technique used on the same data. First, embodiments include no training time. Second, embodiments include simpler, more cost-effective processing eliminating the need for k-means clustering while autonomously partitioning data into groups that preserve similarity. Embodiments can eliminate the need for random selection of data starting points, eliminate the need to define the number of clusters to look for or attempt to assign the data to, and eliminate a subsequent Monte Carlo rerun and artificial monitoring for subjective convergence of cluster number and membership.

Innovative aspects can include, but are not limited to: reduction of memory space required to describe an entire extent of an SV grid, and increased processor efficiency (fewer compute cycles) in determination of whether behavior is an anomaly or classification of an input.

Various embodiments described herein provide streaming and real-time enabled embedded anomaly detection or classification of type and format agnostic data sets. Some embodiments include proven anomaly detection maintained while performance throughput and stability of execution time is improved. Various embodiments demonstrate that the system is fully adaptive and self-initializing requiring no a priori training data to function correctly.

FIG. 1 illustrates, by way of example, a diagram of an embodiment of a system 100 for anomaly detection. The system 100 as illustrated includes processing circuitry 104, classifier circuitry 106, and a memory 116. The processing circuitry 104 can identify an anomaly (a behavior that has not been seen by the processing circuitry 104 up to the point the behavior is seen). The classifier circuitry 106 can present the anomaly to a user for action, adjust SV grid parameters, or the like. The memory 116 can store key values, SV grid parameters, or other data input or output from the processing circuitry 104.

The processing circuitry 104 receives input 102. The input 102 can include binary data, text, signal values, image values, or other data that can be transformed to a number. The processing circuitry 104 can transform the input 102 to a number, at operation 108. The operation 108 can include encoding the input into a specified format, parsing the data into chunks (e.g., chunks of a specified size), or the like. For example, the operation 108 can include encoding text input to an American Standard Code for Information Interchange (ASCII) encoding to transform the input 102 into numbers between zero (0) and two hundred fifty-five (255). In another example, the operation 108 can include converting chunks of binary data to their numerical equivalent, such as two's complement, unsigned integer, floating number (e.g., short or long), or the like. In yet another example, the operation 108 can include performing an analog to digital conversion on analog signal data, such as by an analog to digital converter. In yet another example, the operation 108 can include combining red, green, blue (RGB) values of a color image, or the like, to generate a number. Not all input 102 needs to be transformed, thus the operation 108 is optional.

The processing circuitry 104 can receive numbers either as raw input 102 or from the operation 108 and encode the numbers into two features (discussed below) at operation 110. The operation 110 is order-sensitive, such that the same inputs received in a different order encode (likely encode) to different features.

Examples of features include RM, RS, SM, SS, TM, TS, OC1, OC2, and OCR (discussed below). These calculations are performed in the sequence shown so that they can be calculated in a single pass across the data element where a value derived by an earlier step is used in an antecedent step directly and all calculations are updated within a single loop. RM can be determined using Equation 1:

$$RM_i = (RM_{i-1} + X_i)/2 \qquad \text{Equation 1}$$

In Equation 1, $X_i$ is the ith input value for i=1, 2, ... n.

RS can be determined using Equation 2:

$$RS_i = \left(RS_{i-1} + \sqrt{\frac{(X_i - RM_i)^2}{2}}\right)/2 \qquad \text{Equation 2}$$

SM can be determined using Equation 3:

$$SM_i = \Sigma X_i/n \qquad \text{Equation 3}$$

SS can be determined using Equation 4:

$$SS_i = (SS_{i-1} + (X_i - SM_i)^2/(n-1) \qquad \text{Equation 4}$$

TM can be determined using Equation 5:

$$TM_i = (TM_{i-1} + SM_{i-1})/2 \qquad \text{Equation 5}$$

TS can be determined using Equation 6:

$$TS_i = \left(TS_{i-1} + \sqrt{\frac{(X_i - TM_i)^2}{2}}\right)/2 \qquad \text{Equation 6}$$

Orthogonal component 1 (OC1) can be determined using Equation 7:

$$OC1_i = (RM_i + SM_i + TS_i)/3 \qquad \text{Equation 7}$$

Orthogonal component 2 (OC2) can be determined using Equation 8:

$$OC2_i = (RS_i + SS_i + TS_i)/3 \qquad \text{Equation 8}$$

Orthogonal component rollup (OCR) can be determined using Equation 9:

$$OCR_i = OC1_i + OC2_i \qquad \text{Equation 9}$$

There is no "best" encoding for all use cases (Ugly Duckling Theorem limitation). Each set of encoding features used as (x, y) pairs will yield a different but valid view of the same data, with each sensitive to a different aspect of the same data. "R" features tend to group and pull together, "S" features tend to spread out, "T" features tend to congeal data into fewer groups but sub groups tend to manifest with much more organized structure, and "OC" features tend to produce the most general spread of data. "OC" features most resemble PC1 and PC2 of traditional Principal Component Analysis (PCA) without the linear algebra for eigenvectors.

Each feature is now described in more detail with suggested application:

R-type feature—Associates data into closer, less spread groups, guaranteed to be bounded in SV data space if the encoding is bounded and the SV space is similarly bounded (e.g., if ASCII encoding is used and the x and y extent are bounded from [000]-[255]). R-type features are recommended when the dynamic variability in data is unknown (typically initial analysis). This can be refined in subsequent analysis. R-type features will tend to group data more than other features.

S-type feature—Tends to spread the data out more. How the encoded data spreads can be important, so things that stay together after spreading are more likely to really be similar. S-type features produce a potentially unbounded space. S-type features tend to spread data along one spatial grid axis more than another. Note, if the occupied cells in the SV spatial grid fall along a 45-degree line, then the 2 chosen stat types are highly correlated and are describing the same aspects of the data. When this occurs, it is generally suggested that one of the compressive encoding features be changed to a different one.

T-type feature—These compressive encoding features are sensitive to all changes, and are used to calculate running mean and running sigma exceedances. T-type features can provide improved group spreading over other features types. T-type features tend to spread data along both axes.

OC-type feature—Orthogonal Components, which are simple fast approximations to PCA (Principal Component Analysis). The OC1 component is the average of RM, SM, and TM, OC2 is the average of RS, SS, and TS, and OCR is the sum of OC1 and OC2.

Note that while two variants of each type of feature are provided (e.g., RS and RM are each a variant of an R-type feature) cross-variants can provide a useful analysis of data items. For example, if an RS or RM is used as feature 1, any of the S-type features, T-type features, or OC-type features can also be used as feature 2. Further, two of the same feature can be used on different data. For example, TS on a subset of columns of data from a row in a comma separated values (CSV) data file can form a feature 1, while TS on the same row of data but using a different subset of columns can form a feature 2.

In some embodiments, one or more features can be determined based on length of a corresponding data item. The length-based features are sometimes called LRM, LRS, LSM, LSS, etc.

The features of Equations 1-9 are order-dependent. The features can be plotted against each other on a grid of cells, at operation 112. The processing circuitry 104 can initialize an SV grid to which the encoded inputs are mapped, such as at operation 112.

Plotted values can be associated or correlated, such as at operation 114. The operation 114 can include forming groups of mapped inputs and determining an extent thereof. More details regarding the operations 108-114 are provided in FIGS. 2-4.

The classifier circuitry 106 can provide a user with a report indicating behavior that is anomalous. An input mapped to a cell that was not previously populated is considered anomalous. If an input is mapped to a cell that already has an input mapped thereto by the features, the input can be considered recognized or known. Since some applications can be memory limited, an entity can opt to have few cells in an SV grid. For these cases, it can be beneficial to determine an extent that an encoded value is situated away from a center of a cell. If the encoded value is a specified distance away from the center or a center point (e.g., as defined by a standard deviation, variance, confidence ellipse, or the like), the corresponding data item can be considered anomalous. Such embodiments allow for anomaly detection in more memory-limited devices.

The classifier circuitry 106, in some embodiments, can indicate in the report that an input known to be malicious was received. The report can include the input, the group (if applicable) to which the cell is a member, a number of consecutive inputs, a last non-anomalous data item, a subsequent non-anomalous data-item, such as for behavioral analysis or training, or the like. The classifier circuitry 106 can indicate, in the report, different types of anomalies. For example, a type 1 anomaly can indicate a new behavior that falls within an area of regard (AOR). A type 2 anomaly can indicate a new behavior that falls outside of an area of regard. An area of regard can be determined based on one or more prior anomaly detection epochs. In a given epoch, there can be one or more areas of regard. An anomaly detection epoch is a user-defined interval of analyzing a number of inputs, a time range, or the like. The epoch can be defined in the memory 116 and monitored by the processing circuitry 104.

In some embodiments, an event for the report can include a single anomalous behavior. In some embodiments, an event for the report can be reported in response to a specified threshold number of type 2 anomalies.

The classifier circuitry 106 can adjust SV grid parameters. An initial size of an SV grid cell can be determined. In some embodiments, the initial size of the SV grid cell can include dividing the space between (0, 0) and the encoded (x, y) of the first input data item into an N×N SV grid, where N is the initial number of cells on a side of the SV grid (for example, a 16×16 SV grid would break up the distance in x and in y to the first data point from the origin into 16 equal divisions).

As new input data items are introduced and encoded, whenever one fall outside the extent of the SV grid, the N×N SV grid can be increased in size to (N+1)×(N+1) until either the new input data item is included on the resized SV grid, or N becomes equal to the maximum allowed number of SV grid cells on a side of the SV grid. After N becomes a defined maximum SV grid size (for example 64×64), and a new input data item falls off of the current SV grid, the size of each SV grid cell size can be increased so that the SV grid encompasses the new data point.

As either the number of SV grid cells on a side or the overall extent of the SV grid in x and y are increased to encompass new input data items, the SV grid column (Equation 14), SV grid row (Equation 15), and key index value (Equation 16) can be changed to map the populated SV grid cells from the previous SV grid to the newly size one. To accomplish this, the center (x, y) value of each populated SV grid cell can be calculated using the minimum and maximum x and y values and the number of SV grid cells in the previous SV grid, and then mapping the centers and their associated SV grid counts onto the new SV grid using Equations 14, 15, and 16. This is done using the following equations:

$$\text{Row}=\text{int}(\text{Key Value}/(\text{number of cells on side})) \quad \text{Equation 10}$$

$$\text{Col}=\text{Key Value}-\text{int}(\text{Row}*(\text{number of cells on side})) \quad \text{Equation 11}$$

$$\text{Center 1}=x\text{ min}+\text{Col}*(x\text{ range})/(\text{num. col}-1) \quad \text{Equation 12}$$

$$\text{Center 2}=y\text{ min}+\text{Row}*(y\text{ range})/(\text{num. row}-1) \quad \text{Equation 13}$$

The values for Center 1 and Center 2 can then be used in Equations 14, 15, and 16 (below) as Feature 1 and Feature 2 to calculate the new Key Value for each populated cell on the new SV grid.

Figure 2:
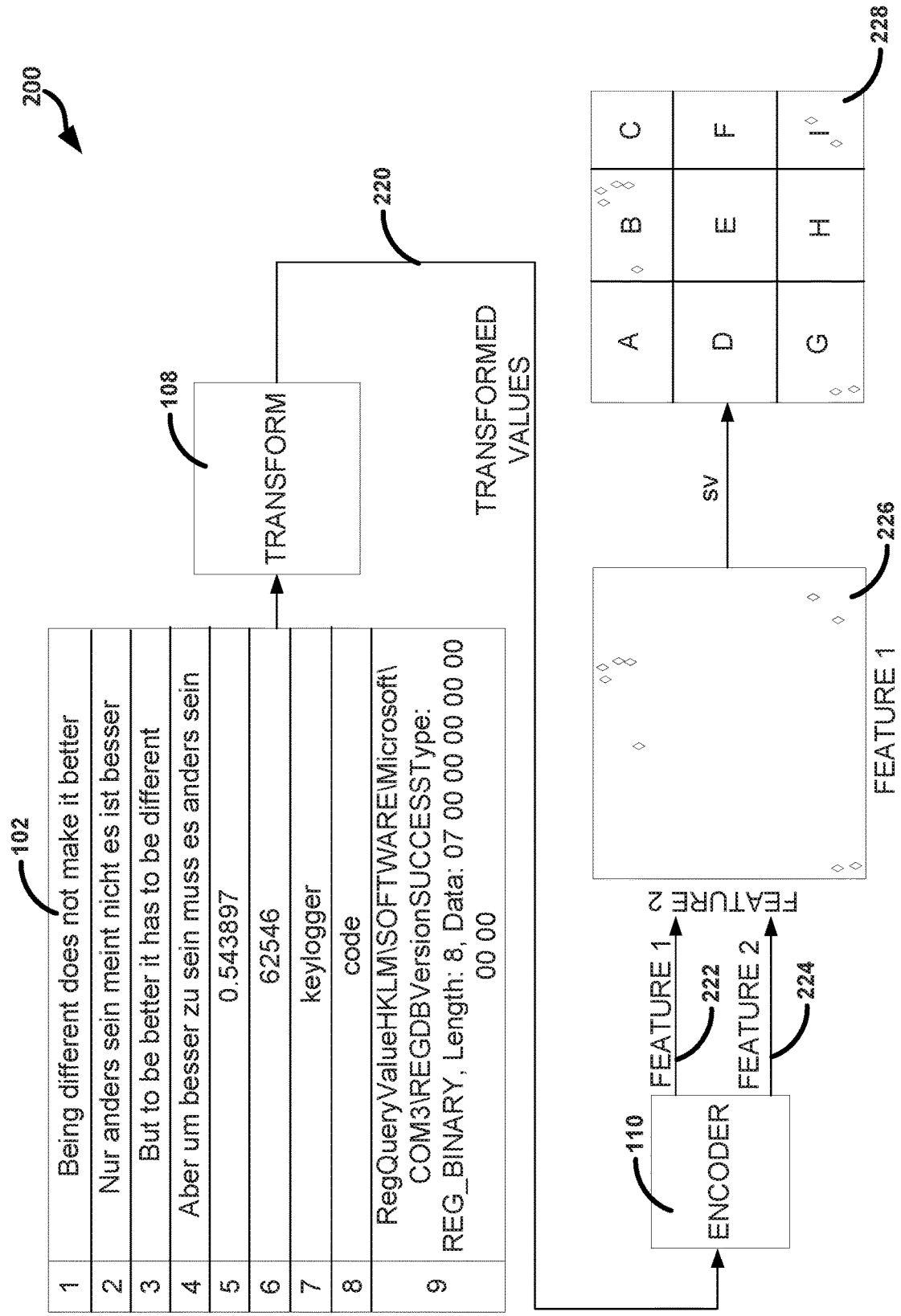
FIG. 2 illustrates, by way of example, a diagram of an embodiment of a method for identifying an anomalous behavior.

FIG. 2 illustrates, by way of example, a diagram of an embodiment of a method 200 for identifying an anomalous behavior. The method 200 as illustrated includes receiving the input 102. The input 102 in FIG. 2 includes nine text strings labelled "1"-"9". Each of the text strings "1"-"9" of the input 102 is respectively transformed to transformed values 220 at operation 108. An example transformation is ASCII encoding which transforms text to numerical values. The transformed values 220 can be used to perform the operation 110. The operation 110 can include determining two features 222, 224 of the input 102 and plotting them against each other to form a feature graph 226. The features 222, 224 can include, for example, RM, RS, SM, SS, TM, and TS, in some embodiments.

Consider the input data item "1". Each character of the input data item "1" can be transformed to an ASCII value. The features can be determined based on the ASCII encoding of the entire string. That is, X, is the ASCII value of each character and the features are determined over all ASCII encodings of the characters of the input data item "1". As an example, the resultant RM can be feature 1 222 and the resultant RS can be feature 2 224, or vice versa. This is merely an example and any order-dependent feature can be chosen for feature 1 and any order-dependent feature chosen for feature 2. Each of the input data items "1"-"9" can be processed in this manner at operation 108 and 110.

The graph 226 can then be split into cells to form a grid of cells 228. The cells of FIG. 2 are labelled "A"-"I" for illustration (we will introduce Key Values to numerically label the SV grid cells in Equation 16). Inputs 102 mapped to a same cell can be considered similar. Inputs 102 mapped to an empty cell can be considered anomalous. In the grid of cells 228, input data items "1"-"4" (sentences in English and German) are mapped to cell "B", input data items 5-6 (numbers) are mapped to cell "I", and input data items "7-8" (words) are mapped to cell "G". Input data item 9, which is a combination of words, numbers, and other characters, maps to cell "B" indicating that input data item "9" is more like a sentence than a word or number. If a subsequent input 102 were to be received and mapped to cell "A", "C", "D", "E", "F", or "H" it can be deemed anomalous, as it is a behavior that has not been received before and is sufficiently different from other behaviors that have been seen previously.

As can be seen, whether an input is considered an anomaly is dependent on a size of a cell. The size of the cell can be chosen or configured according to an operational constraint, such as a size of a memory, compute bandwidth, or the like. The size of a cell can be chosen or configured according to a desired level of security. For example, a higher level of security can include more cells, but require more memory and compute bandwidth to operate, while a lower level of security can include fewer cells but require less memory and bandwidth to operate.

Figure 3:
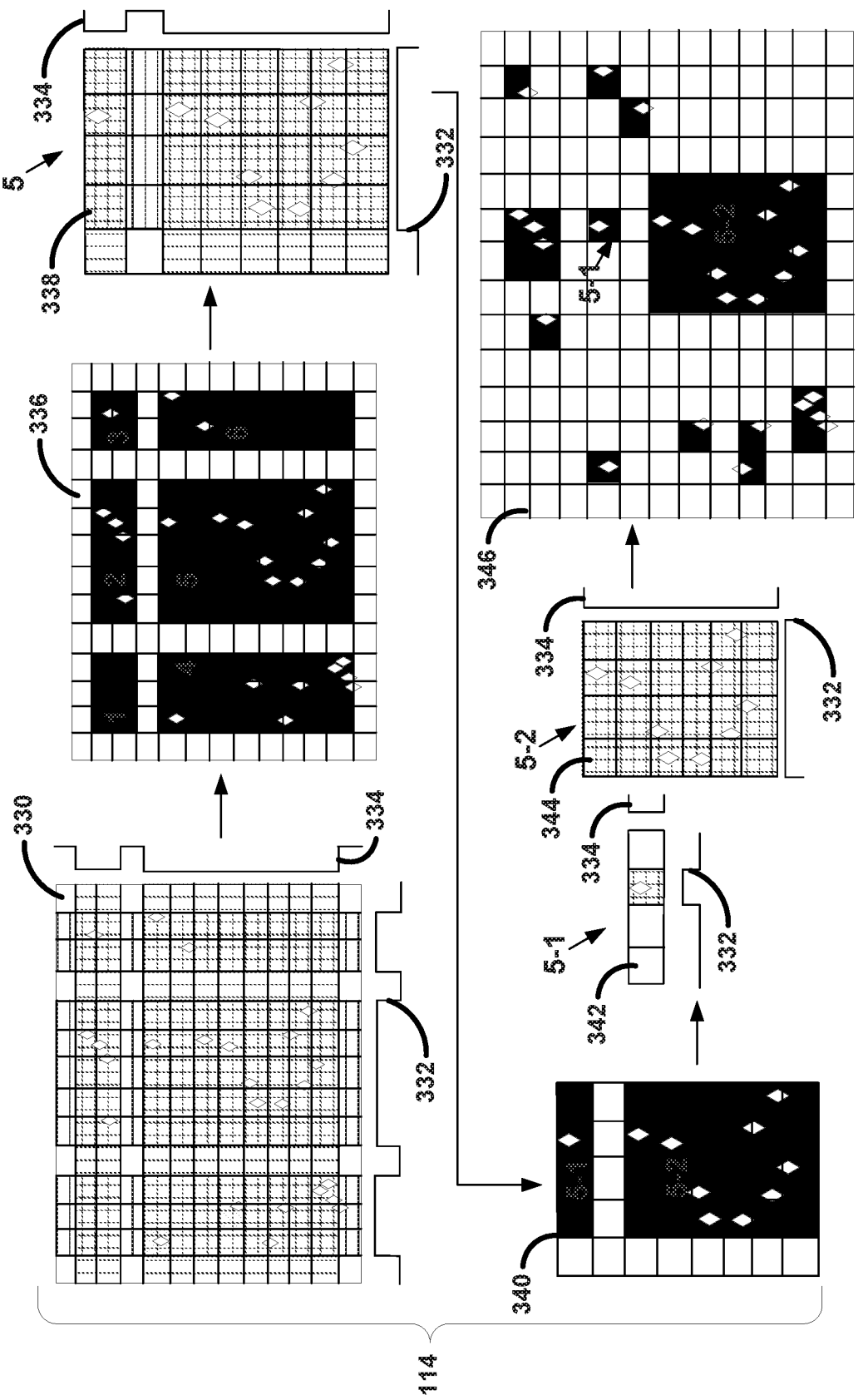
FIG. 3 illustrates, by way of example, a diagram of an embodiment of the operation.

FIG. 3 illustrates, by way of example, a diagram of an embodiment of the operation 114. Encoded inputs ((x, y) points) are represented by diamonds. The operation 114 (sometimes called shadowing for group extraction) can include an iterative process that identifies cells that are populated and aggregates and separates those cells into groups. The iterative process can include:

1) Identifying cells of columns with at least one populated cell at operation 332 (indicated by horizontal hashing in graph 330)
2) Identifying cells of rows with at least one populated cell at operation 334 (indicated by vertical hashing in graph 330)
3) For each cell identified at both (1) and (2) (indicated by cross-hashing in the cell), (a) aggregate with all contiguous cells identified at both (1) and (2), (b) assign aggregated cells to a group, and (c) label the group with a key
4) Repeat (1)-(3) for each group/sub-group until no change.

A graph 336 illustrates the result of a first iteration of performing the operations (1)-(3). After the first iteration, six groups "1"-"6" in FIG. 3 are formed. Next each of the groups "1"-"6" are processed by operations (1)-(3). In FIG. 3, the second iteration is illustrated for group "5". The operations 332 and 334 can be performed on a sub-grid 338 formed by the cells of group "5". A graph 340 illustrates the result of the second iteration of performing the operations (1)-(3). After a second iteration on group "5", two subgroups "5-1" and "5-2" are formed in the example of FIG. 3.

In the example of FIG. 3, a third iteration of the operations (1)-(3) is performed on the subgroups "5-1" and "5-2". The operations 332 and 334 can be performed on sub-grids 342, 344 formed by the cells of sub-groups "5-1" and "5-2". A graph 346 illustrates the result of the performing all iterations of the operations (1)-(3) and the groups formed therefrom.

In some embodiments, the number of cells can be adaptive, such as to be adjusted during runtime as previously discussed. Related to this adaptive cell size is determining the location of an encoded input in the grid and a corresponding key value associated with the encoded input. An example of determining the location in the grid includes using the following equations (for an embodiment in which feature 1 is plotted on the x-axis and feature 2 is plotted on the y-axis):

$$Col=int((feature\ 1-x\ min)*(num.\ col-1)/(x\ range))\quad Equation\ 14$$

$$Row=int((feature\ 2-y\ min)*(num.\ row-1)/(y\ range))\quad Equation\ 15$$

An encoding on the grid, sometimes called key value, can be determined using Equation 16:

$$Key\ Value=num.\ row*Row+Col\quad Equation\ 16$$

The "x min", "y min", "x max", and "y max" can be stored in the memory 116. Other values that can be stored in the memory 116 and relating to the grid of cells include "max grid size", "min grid size", or the like. These values can be used by the processing circuitry 104 to determine "x range", "num. col.", "y range", or "num. row", such as to assemble the grid of cells or determine a key value for a given encoded input (e.g., (feature 1, feature 2)).

A series of key values representing sequential inputs can be stored in the memory 116 and used by the classifier circuitry 106, such as to detect malicious (not necessarily anomalous) behavior. A malicious or other behavior of interest can be operated on by the processing circuitry 104 and the key values of the behavior can be recorded. The key values can be stored and associated with the malicious behavior. Key values subsequently generated by the processing circuitry 104 can be compared to the key values associated with the malicious behavior to detect the malicious behavior in the future.

Figure 4:
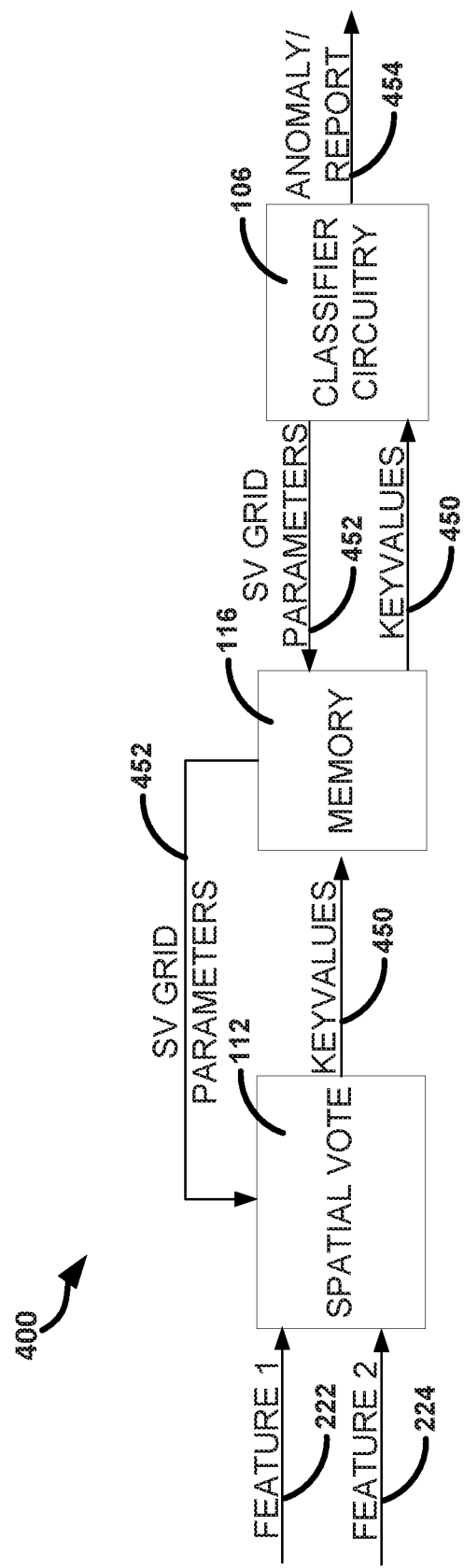
FIG. 4 illustrates, by way of example, a diagram of an embodiment of a system for anomaly detection.

FIG. 4 illustrates, by way of example, a diagram of an embodiment of a system 400 for anomaly detection. The system 400 includes an exploded view diagram of a portion of the system 100. The system 400 as illustrated includes the operation 112 of the processing circuitry 104, the memory 116, and the classifier circuitry 106. The operation 112 determines key values 450 based on SV grid parameters 452 from the memory 116 and features 222, 224 determined by the processing circuitry 104.

The key values in the memory 116 can allow for F-testing, t-testing, or Z-score analysis, such as by the classifier circuitry 106. These analyses can help identify significant columns and cells. The classifier circuitry 106 can provide event and pre-event logs in a report 454, such as for further analysis. The report 454 can provide information on which column or cell corresponds to the most different behavior.

As may be evident, an SV grid can be cumbersome to store. As the resolution of the SV grid increases (e.g., more, smaller cells corresponds to a higher resolution than fewer, larger cells), the more data is required to store the SV grid and the previously seen behaviors (in the form of key values). For the SV grid to be used in devices with more limited memory, a more efficient description of the SV grid can be beneficial.

FIG. 5 illustrates, by way of example, a diagram of an embodiment of an SV grid 500 with 81 cells (9×9 grid of cells). The SV grid 500 is shown with each cell 502 populated with a behavior indicator. The behavior indicator is either one (1) or zero (0) in the example of FIG. 5. In the example of FIG. 5, a behavior indicator of "1" in a cell 502 indicates that at least one behavior (an input) has been mapped to that cell previously (the behavior has been seen or is similar to a behavior seen previously), while a behavior indicator of "0" in a cell 502 indicates that a behavior has not previously been mapped to that cell.

One way to store the SV grid 500 would be to store data indicating an overall extent of the SV grid 500, an extent of each cell 502, a cell identification (ID) (sometimes called a key value) with each cell 502, and behavior indicator that identifies whether an input has been mapped to the cell 502. The amount of memory consumed by such storage becomes prohibitively cumbersome as the number of cells of the SV grid 500 increases.

Primitive languages, such as American National Standards Institute (ANSI) C, only support lists of strings for string variable assignment. Thus, storing key values as strings in a list leads to a growing list length that must be fully searched every new data instance to determine if the key value exists. Lack of formal GOTO statements where a string key value could be defined and used as a demarcator and a potential GOTO statement jump to it directly is not possible in the C implementation of GOTO and case statements are not feasible either. Resorting a growing list of keys to make jumping efficient is computationally too expensive for embedded real time use and requires ever growing array space, thus allowing only storing keys as they occur generating an apparent random sequence unique to each use case run. When the list grows, the growth slows down the search time to determine if a key exists and then requires appending to the growing list a new key for the new anomaly just encountered and slowing the next search even more. One solution includes replacing one global list of keys with multiple lists, one for groups and another for keys within each respective group. This allows testing for extent of groups from a shorter list of group extents. If and only if a match with an existing group is encountered is the list of keys within each respective group searched for the existence of the sought key. This vastly increases the number of data points that can be stored and quickly searched because the data space has been auto-partitioned into groups first and then reduced to searching keys within a single group.

This process for very large spaces and runs and possibly using the same SV space for vastly different use cases that populate large spatially separate regions of the SV grid (which can occur if packet data is processed in one use case and thereby learned from experience and the same SV grid is now run against an ASCII character plain-English text data set), the encoded values can map far away from the encoded values of small fixed length packets. However, knowledge transfer from the packet space to include the parsed and reconstructed payload and ASCII text within the packets can now be encompassed with one global SV accumulated experience base. The problem is now that the list of groups is growing large (as the original number of keys grew large before) and eventually searching a list of group extents slows down as did searching a global list of key extents did as well.

So the problem is not alleviated by partitioning of search spaces into lists alone. The process of grouping, such as by shadowing (see FIG. 3), can be an external process imposed at the conclusion of an epoch run and thus does not qualify as a true ITM driven solely of data compressively sensed content. A method for achieving auto-partitioning with the SV grid represented in an efficient string form and a method of reducing and bounding the maximum number of tests required to determine if a key exists is mandatory to achieve fixed memory embedded processing is desired and discussed herein.

A more efficient representation of the SV grid 500 can include the overall extent of the SV grid 500, a delta extent of each cell 502 in the feature 1 and feature 2 directions, a row run length encoding (RLE), a column RLE, and an RLE encoding of all cells of a row or column that includes a cell with a behavior indicator that indicates an input has been mapped to the cell. Any row or column that does not include any cell with a behavior indicator that indicates an input has been mapped to the cell can remain unencoded and no data for that particular row or column needs to be stored beyond an indication that the row or column does not include an input mapped thereto.

An RLE is an Information Theoretic form of lossless compression in which runs of data are stored as a single data entry indicating a value and a count indicating the number of consecutive entries of the value, rather than storing each instance in the run. For example, consider the binary sequence "00000111100000". An RLE of the sequence can include an indication of the first value, the number of consecutive instances of the value, the second value, the number of consecutive instances of the second value, etc. In an RLE of a binary sequence, the second value and all subsequent values can be skipped as there are only two alternating values "0" and "1". Further, the final run can be excluded from the encoding as long as the length of the sequence being encoded is known. The presented binary sequence can thus be encoded as $\{0, 5, 4\}$. The "0" indicates the starting value is the binary "0", the "5" indicates that there is a run of five such "0"s, the "4" indicates that the next four values are "1"s, and if it is known that the sequence is fourteen characters long, the lack of data indicates that the final five values of the sequence must all be "0"s. If the length of the sequence is unknown, the RLE can be $\{0, 5, 4, 5\}$ to indicate that the sequence ends with five zeros. These two RLE sequences can be efficiently and compactly represented as ASCII strings "0,5,4,5" or "0,5,4" respectively or for certain ASIC and register memory only based systems can be converted into a special long integer form by permanently starting with "1" so leading zero does not vanish forming the integers 10545 and 1054 respectively.

The row RLE and column RLE can indicate whether there are any cells in a respective row or column that include an input mapped thereto. For example, consider the SV grid 500. A row RLE can include $\{1, 9\}$. This RLE indicates that each row R0-R8 includes at least one cell with an input mapped thereto. A column RLE for the SV grid 500 can include $\{0, 2, 3, 2, 1\}$. This column RLE indicates that columns C0, C1 include no cells with an input mapped thereto, the next three columns C2, C3, C4 include at least one cell with an input mapped thereto, the next two columns C5, C6 include no cells with an input mapped thereto, the next column C7 includes at least one cell with an input mapped thereto, and the last column C8 includes no cells with an input mapped thereto.

The RLE for each column that includes at least one cell with an input mapped thereto can include a similar structure.

In the example of FIG. 5, an RLE for each of columns C2, C3, C4, and C5 can be generated and stored. With the encoding of the columns, the grid cell size and extent, an entire SV grid image mask can be re-created without loss. There is no attempt made to preserve counts, only determination of presence. Counts are not necessary to be stored within the SV gridding process and can be stored off-line if needed as a Group based Markov model updated every data point or at the end of an epoch or by means of lists of group-key files updated by adding +1 to their current value, which can be done offline and is not necessary to achieve or facilitate self-aware anomaly detection based on experience to date.

Figure 6:
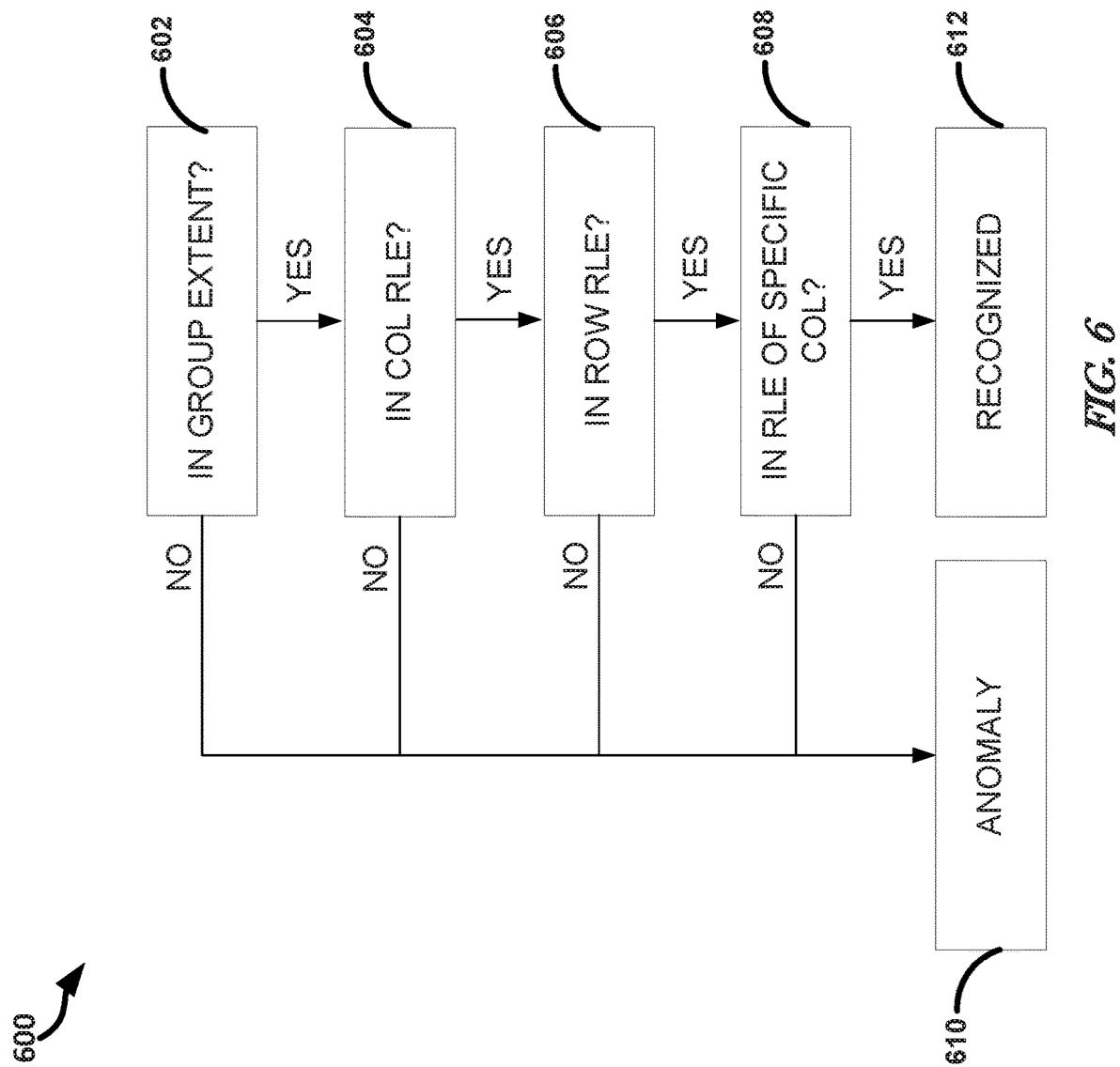
FIG. 6 illustrates, by way of example, a diagram of an embodiment of a method for identifying whether a key value is anomalous based on an RLE of an SV grid.

FIG. 6 illustrates, by way of example, a diagram of an embodiment of a method 600 for identifying whether a key value is anomalous based on an RLE of an SV grid. The method 600 as illustrated includes determining whether a point (e.g., [feature 1, feature 2]) to which the input is mapped is in a group extent, at operation 602; whether the column to which the point is mapped (see Equation 14) is in a column RLE, at operation 604; whether the row to which the point is mapped (see Equation 15) is in a row RLE, at operation 606; and whether the row and column to which the point is mapped is in an RLE of the specific column, at operation 608. If, at any of the operations of the method 600, the test fails, the input is determined to be an anomaly, at operation 610. If, at any of the operations of the method 600, the test succeeds, the method 600 continues to the next operation. If all operations 602, 604, 606, and 608 succeed, the input is determined to be recognized at operation 612.

The operation 602 can include comparing the feature 1 value to feature 1 extents of one or more groups and if feature 1 falls within an extent of a group, the feature 2 value can be compared to the feature 2 extent of the group. Groups were discussed with regard to FIG. 3. In general, a group is an association of mapped points determined to be similar, such as by their proximity to one another or their presence in a cell or subset of cells. FIG. 3 illustrates multiple iterations of a grouping process. The group extents to which the operation 602 compares the mapped input can be defined after one or more of the iterations of the grouping process (and removal of any empty groups). The group extent can include (1) a minimum and maximum for both features of all input mapped to the group or (2) a minimum and maximum for cells to which the inputs of the group are mapped. That is, the group extent can be defined by the potential maximum allowable number of cells allowed to represent a group based on a priori memory limitations pre-defining the full extent of a group that contains only a single occupied cell, the mapped input extent of points in the group, or the like. For groups of only a single point, the cell extent to which the input is mapped can define the group extent.

The operations 604 and 606 are similar, but for different RLEs. Consider the previous row RLE and column RLE discussed regarding FIG. 5. The row RLE indicates, for each row of the SV grid, whether there are one or more cells in the row that include an input mapped thereto or there are no cells in the row that include an input mapped thereto. The column RLE indicates, similarly, for each column of the SV grid, whether there are one or more cells in the row that include an input mapped thereto or there are no cells in the column that include an input mapped thereto. Thus, at operation 604, whether a given column has any cells with any inputs mapped thereto can be determined using the column RLE. Similarly, at operation 606, it can be determined whether a given row has any cells with any inputs mapped thereto using the row RLE.

At operation 604, if the column RLE indicates that the column to which the input is mapped includes an input mapped thereto, operation 606 can be performed. At operation 606, if the row RLE indicates that the row to which the input is mapped includes an input mapped thereto, operation 608 can be performed.

At operation 608, the RLE of the specific column to which an input is mapped can be analyzed to determine if a specific cell in the column has had an input mapped thereto. If so, the input can be considered recognized, at operation 612. A stack count indicating the number of inputs that have been mapped to the cell to which the input is mapped can be incremented.

If any one of the operations 602, 604, 606, and 608 fails, the input can be considered anomalous at operation 610. In response to determining that an input is anomalous at operation 610, one or more of the following can be updated: (1) the row RLE that includes the cell to which the input is mapped can be updated, (2) the column RLE that includes the cell to which the input is mapped can be updated, and (3) the specific column (or row) RLE that includes the cell to which the input is mapped can be updated. The update can reflect that the column, row, or cell now has an input mapped thereto. Thus, if a subsequent input is mapped to the same cell, that input will be deemed recognized at operation 612.

Note that the order of the operations of the method 600 can be changed. For example, operations 606 and 608 can be swapped. Note also, that operations 602, 604, and 606 are optional, but can reduce an amount of time it takes to determine whether an input is anomalous or recognized.

In classifying inputs a distinction may be made between 1) Groups that are defined by extent and therefore may have empty cells allowing any new data that falls inside the existing Group to be declared as "Being inside of a recognized group but with a new or anomalous key", versus 2) a brand new Group being defined that would be an "unrecognized group that when populated forms anomalous new keys within the unrecognized group". Thus, it can be important to make sure that recognized versus unrecognized are not necessarily synonyms for anomalous versus nominal. For certain use cases, this distinction can be important and enable expected variations that are new keys within recognized groups to be treated with one level of significance different from data generating a brand-new group and/or also populating new keys outside of any existing recognized group. By observing ratios of the within recognized group new keys as "expected variations" and those forming new Groups as "unexpected variations", significant discrimination between the two distinctions is achievable without additional calculations or external provided threshold criteria that introduces heuristics rather than relying on pure Information Theoretic strategies and methods of embodiments. Note further that not all of the row RLE, column RLE, or RLE of specific column (or row) may need to be updated in response to identifying an anomaly. For example, if, at operation 604, it is determined that the column RLE indicates that the column to which the input is mapped has had an input previously mapped thereto, the column RLE need not be updated. A similar update to the row RLE is not needed if the operation 606 indicates that the row to which the input is mapped has had an input previously mapped thereto.

In another example, consider that, at operation 602 an input is determined to map to a group. The remaining operations 604, 606, 608 can be constrained to searching the column RLE, row RLE, or RLE of the specific column only within the extent of the group to which the input is determined to map. That is, the entire extent of the column RLE, row RLE, or RLE of the specific column need be searched as it was determined at operation 602 that the input was mapped to a group with a defined extent. The remaining operations can be constrained to searching on the defined extent of the group.

Figure 7:
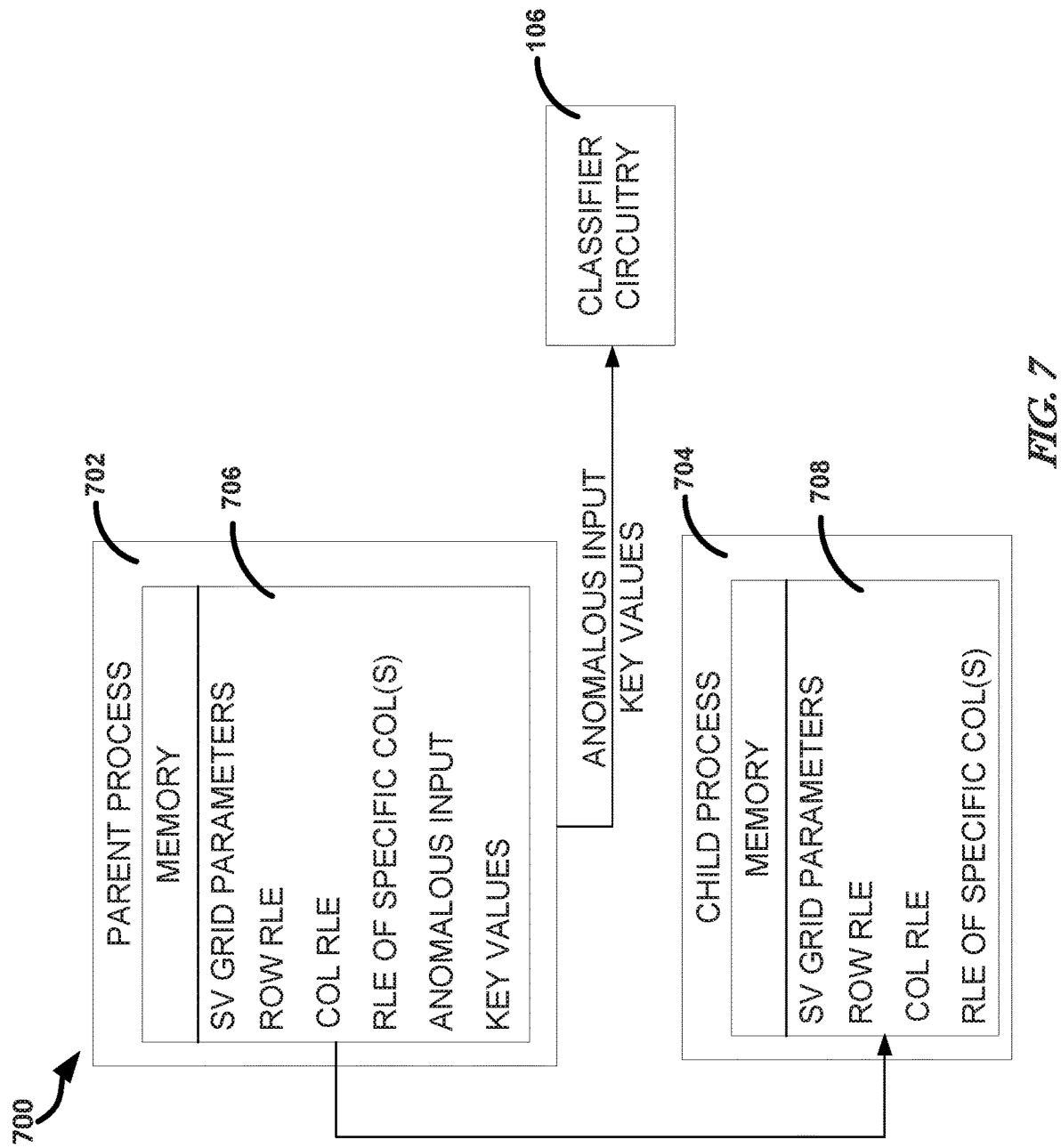
FIG. 7 illustrates, by way of example, a diagram of an embodiment of a system for behavior monitoring.

FIG. 7 illustrates, by way of example, a diagram of an embodiment of a system 700 for behavior monitoring. The system 700 as illustrated includes a parent process 702, a child process 704, and the classifier circuitry 106. The parent process 702 can be monitoring behavior of one or more devices. The parent process 702, during operation, can store SV grid parameters, such as a maximum feature 1 value, maximum feature 2 value, minimum feature 1 value, minimum feature 2 value, cell size, number of cells (e.g., number of rows and number of columns), an origin of the SV grid, or the like. The row RLE can indicate whether one or more cells of each row of the SV grid include an input mapped thereto. The column RLE can indicate whether one or more cells of each column of the SV grid include an input mapped thereto. The RLE of specific column(s) (or row(s)) can indicate, for each column with an input mapped thereto (as indicated by the column RLE), whether each cell of the column includes an input mapped thereto. The anomalous input can include the data corresponding to the raw input that was determined to be anomalous. The key values can include a series of key values to which the input received at the parent process is mapped.

As the amount of data stored in the memory 706 passes a threshold amount of data or a specified amount of time has passed, a specified time has passed, or a threshold number of inputs have been processed, the parent process 702 can offload at least a portion of its memory 706 to the child process 704. The child process 704 can be monitoring the same or similar devices as the parent process 702. The child process 704 can thus "inherit" the data of the parent process 702 and operate with the knowledge of the parent.

Since an RLE can be stored as a variable type "string", the RLEs can be stored in a register memory. As the RLEs and the representation of the SV grid (separate from the data regarding the monitored behavior) can have a maximum, small length, the behavior monitoring can be performed on an embedded device. The RLE representation and testing the RLE representation for anomalous or recognized behavior eliminates an exhaustive search of a list of keys and the need for sorting such lists in memory.

Using the RLE of the SV grid grouping of closely associated SV grid keys is still possible. Further, anomalous behavior detection of type 1 (expected anomalies) and type 2 (unexpected-unknown-unknown anomalies) can be accomplished, still without a priori training nor assumption of anomaly characteristics.

Embodiments, in general represent the virtual SV grid as columns (or rows) that either do or do-not contain a populated key (0\1). If a populated SV grid is examined along the horizontal feature 1 axis, each x location can be defined as a column of feature 2 cells. Such a column is frequently sparse (as suggested by empirical evidence) and has more empty cells than populated ones making RLE an attractive lossless compression representation.

Embodiments can create an RLE of a specific column for those columns that contain one or more populated cells in feature 2. The feature 1 axis can be represented as its own RLE, to quickly indicate which feature 1 columns have one or more inputs mapped thereto. This short form column RLE makes checking the calculated feature 1 value to a specific feature 1 location a single test. If the column RLE indicates that the column has had no inputs mapped thereto, there can be no populated key corresponding to that column and the data can be declared anomalous. The RLEs can be updated to define the new key populated by the row. If the feature 1 value maps to a column that has had an input mapped thereto, a second test can be done on the feature 2 axis RLE (row RLE) to determine which, if any, row RLE contains the populated cell. This test quickly identifies the feature 2 index value and defines the unique name of the feature 2 RLE possibly containing the exact cell\key index. The list of defined feature 2 RLEs can be indexed using "GOTO" supported in C and CUDA, thus bypassing sequential searching the correct RLE string found and parsed to determine if the cell is present if so then the data is nominal.

By knowing how much register memory an embedded device has, a limit can be placed, a priori, on how many RLE sequences can be held in active memory versus those that are compiled into source code as string variables. The hardwired RLE sequence strings can define the knowledge contained by the SV grid of the parent process 702. The exportation of C, CUDA, or other programming language classifiers in source code that contain the RLE strings defined as string variables is possible with the RLE encoding. This structure is accommodated by the compiler, thus eliminating the need for memory allocation (malloc) yet enabling anomaly detection to occur using the encoded SV grid. Using RLE, it is no longer necessary to store key index values, since these can be determined during execution and written into output messages from the process, thereby enabling presence/absence testing for storage in source code.

Further, an RLE representation of an SV grid can be programmed in hardware. For example, a transistors can be biased in such a manner that they produce a sequence of bits that is the RLE encodings of the SV grid. As the SV grid encodings change, the biasing of the transistors can change. In this manner, the complete knowledge of the SV grid can be embedded in hardware. Such a hardware embedding can evade reverse engineering and protect knowledge of the SV grid.

Figure 8:
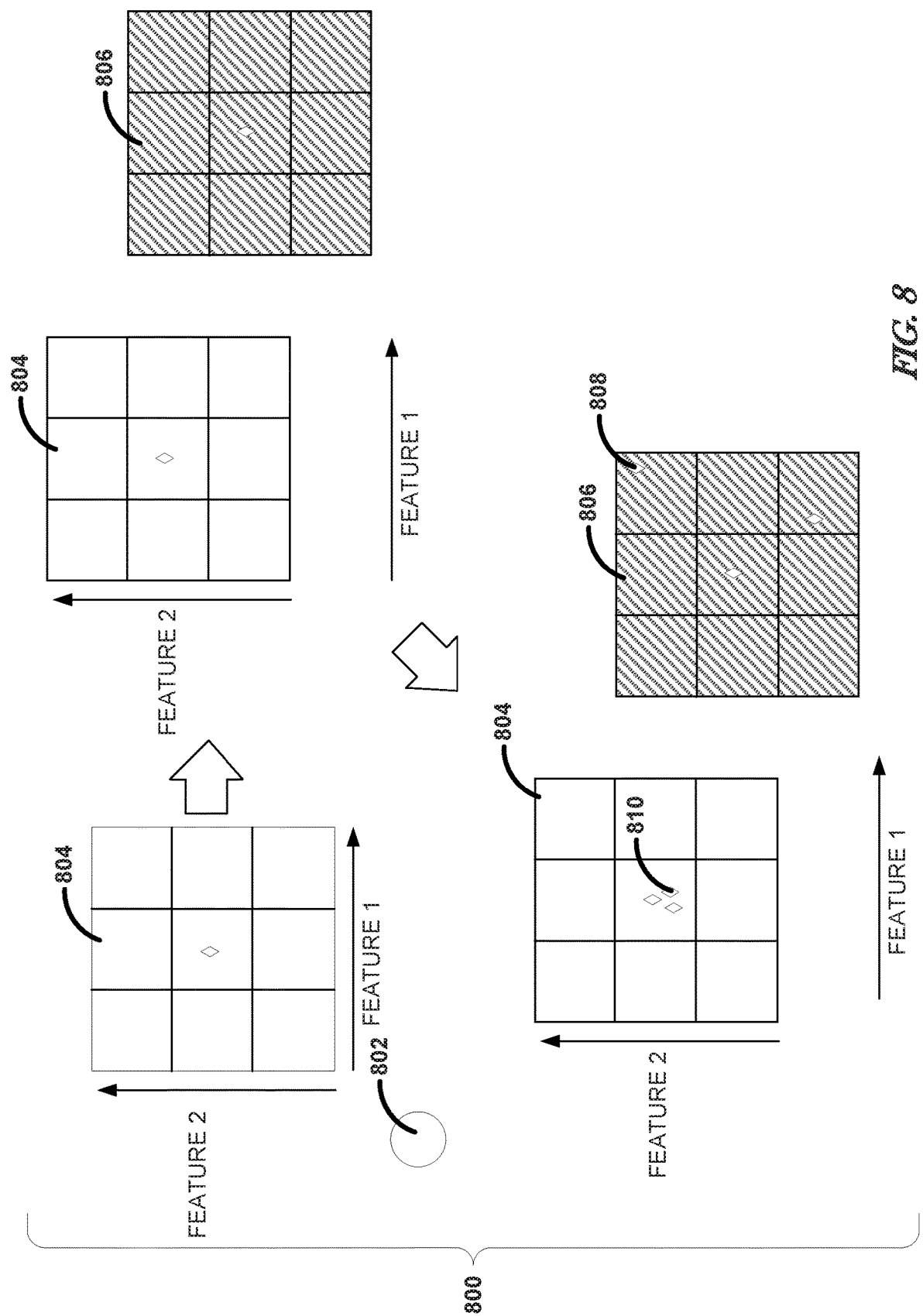
FIG. 8 illustrates, by way of example, a diagram of an embodiment of a method for generating an SV grid using adaptive auto grouping (AAG).

FIG. 8 illustrates, by way of example, a diagram of an embodiment of a method 800 for generating an SV grid using adaptive auto grouping (AAG). The method 800 is different than the methods discussed previously in that a maximum extent of the SV grid is not defined a priori and the SV grid generated using the method 800 need not be continuous in extent. Using the method 800, only portions of the SV grid that include an input mapped thereto are defined. If an input is mapped to a portion of the SV grid that has not yet been defined, a new portion of the SV grid is defined to accommodate the input.

An origin 802 is chosen and defined. A size of a cell (e.g., extent in feature 1 direction and extent in feature 2 direction), a number of rows of cells, and a number of columns of cells in a group can be defined. The origin 802 can be defined at a point to which an input cannot be mapped. For example, if feature 1 is strictly a positive number, the origin can be defined at a negative value for feature 1. The origin 802 provides a relative location from which the remainder of the SV grid can be defined or determined.

An input can then be received and processed, such as by performing operations 108, 110, and 112 (see FIG. 1). The cell to which the first input is mapped on the SV grid is defined as a cell in the center of a first group of cells 804 which can have an odd number of rows and an odd number of columns, otherwise the first point would not represent the true center of the group and its extent. It can be preferred to define the SV grid for a group of cells 804 so that the SV grid is symmetric in feature 1 and in feature 2 in terms of the number of cells in each axis, although the extent or size of each cell in feature 1 and in feature 2 do not necessarily have to be the equal. The cell of the group of cells 804 to which the first input mapping into the group is defined as the center cell for the group of cells 804. The group of cells 804 can include an odd number of rows of cells and an odd number of columns of cells. The number of rows of cells can be the same or different as the number of columns of cells. Each subsequent group can include the same size (same cell extent and number of cells), although this is not a required condition.

A next input can be received and processed, such as by performing operations 108, 110, and 112. If the input is mapped to a cell of the first group of cells 804, no additional cells are defined, and the key value of the cell to which the next input is mapped can be recorded. The group of cells 804 can be associated with a group number (e.g., a positive integer). The first group formed can be assigned group number 1, the second group formed can be assigned group number 2, and so on. Other numbering conventions are possible.

If the next input is mapped to a location outside the group of cells 804, a new group of cells 806 can be defined and the input mapped thereto can be declared anomalous. The cell to which the next input is mapped on the SV grid can be defined as a center cell of the next group of cells 806. The group of cells 806 must have an odd number of rows and an odd number of columns. The group of cells 806 can include a same or different number of rows, columns, and cells as the group of cells 804. A group number associated with the next group of cells 806 can be incremented by one from the group number associated with the immediately preceding group of cells.

Subsequent inputs can be mapped to the SV grid that is defined by the groups of cells. An input that is mapped within a group, but to a cell of the group that does not currently include an input mapped thereto can be declared anomalous. Each anomalous input can be recorded (e.g., the raw input or the values of feature 1 and feature 2) along with a group and cell number to which the input is mapped. For example, the input 808 can be deemed anomalous since it is mapped to a cell of the second group and that cell had not previously had an input mapped thereto. In contrast, the input 810 can be declared recognized since it is mapped to a cell of the first group and that cell has previously had an input mapped thereto. A count of a cell to which a recognized input is mapped can be incremented.

Figure 9:
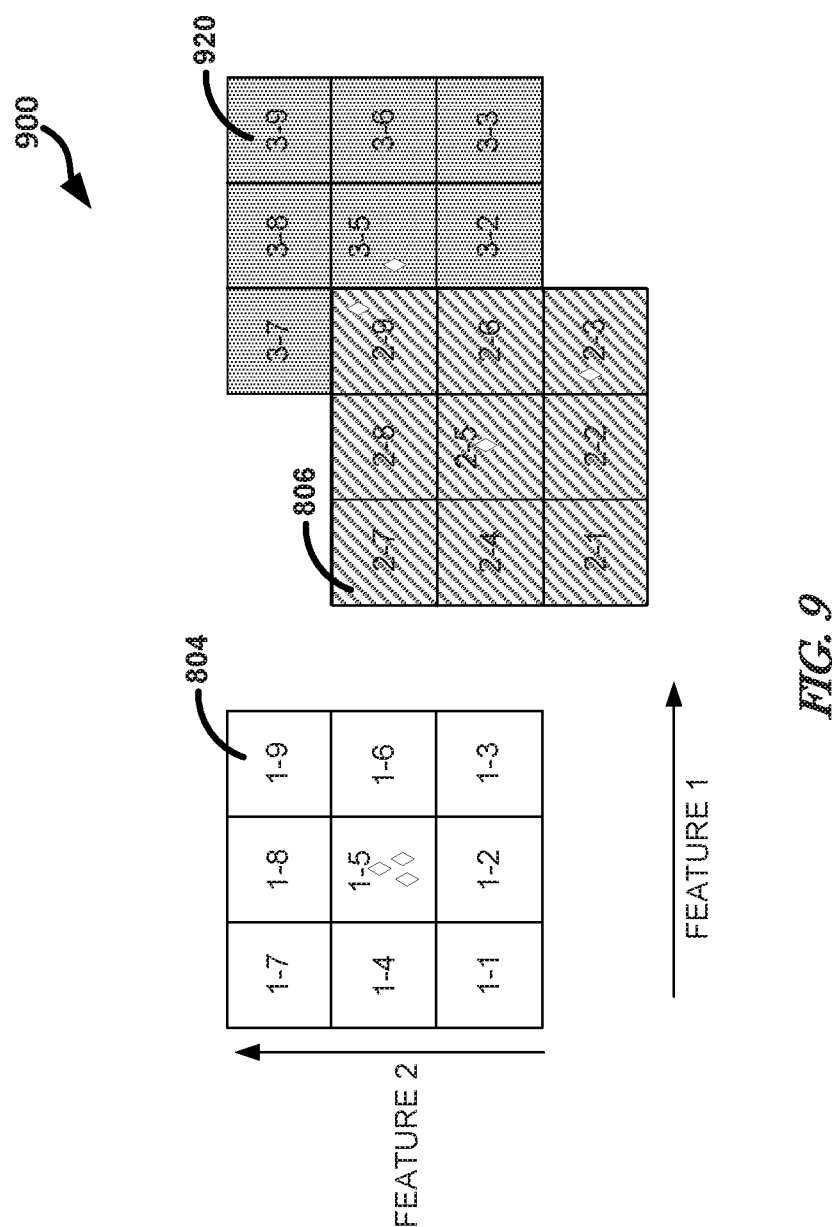
FIG. 9 illustrates, by way of example, a diagram of an embodiment of an SV grid that includes the SV grids of FIG. 8 after a seventh input is mapped thereto.

FIG. 9 illustrates, by way of example, a diagram of an embodiment of an SV grid 900 that includes the SV grids of FIG. 8 after a seventh input is mapped thereto. The SV grid 900 includes three groups of cells 804, 806, and 920. The group 920 is formed in the same manner as the second group of cells 806, except the group 920 overlaps with the second group of cells 806. In such a situation, embodiments can use a heuristic to determine to which group the cells that overlap belong. In the embodiment of FIG. 9, the heuristic is that the cells do not change group. Once the cells are a member of the group of cells 806, they remain part of the group of cells 806. This means that the effective extent of the third group is smaller than the extent of the first and second groups of cells 804, 806. The term "effective extent" means that the cells that overlap remain part of both groups, but anything mapped to one of these cells in the overlap is considered part of the group that was formed first. It further means that the key values of the cells of the group 920 will not perfectly mirror the key values of the cells of the groups of cells 804, 806. The key values for the first group of cells 504 are illustrated at 1-1, 1-2, 1-3, . . . , 1-9. The key values for the second group of cells 506 are similarly 2-1, 2-2, 2-3, . . . , 2-9. The key values for the third group are similar, but do not include 3-1 and 3-4, as those cells are part of the second group of cells 806. The labelling of the key values is arbitrary, but labelling them as [group, cell] as in FIG. 9 can help save memory space over alternative labels.

An alternative labelling that is just as efficient as the one illustrated in FIG. 9 can include labelling the cells in numeric order regardless of position in the group. This labelling scheme would change "3-2" to "3-1", "3-3" to "3-2", "3-5" to "3-3" and so on. Note that while cells are numbered in increasing order from left to right and bottom to top, another numbering scheme can be used, such as increasing from top to bottom, increasing from right to left, a combination thereof, or the like.

The SV grid 900 of FIG. 9 can be defined as: [origin, cell extent, number of cells in group, group 1 center, group 2 center, group 3 center] where the origin is the relative location to which other points in the SV grid 900 are defined, the cell extent indicates the distance in both feature directions a cell occupies, the number of cells in the group indicates a number of rows and columns of cells for each group (assuming non-overlapping), and group 1 center, group 2 center, and group 3 center indicate the center cell from which the remainder of the group can be inferred by the cell extent and number of cells in the group.

For each group, each cell to which an input has been mapped can be recorded. Each cell to which an input was not previously mapped can be recorded and reported or reported in real-time. An efficient group description can include a run length encoding (RLE) of the group. The RLE encoding can include a row RLE, a column RLE, and a column specific RLE (or row specific RLE) for each column (or row) with at least one input mapped thereto. For the group of cells 506, the RLE encoding can include row RLE {1, 3}, column RLE {0, 1, 2}, and column specific RLEs {0, 1, 1}, {1, 1, 1}. The row RLE {1, 3} indicates that there is at least one cell in each of the three rows that includes an input mapped thereto. The column RLE {0, 1, 2,} indicates that the first column of the group includes no inputs mapped thereto and that the remaining two columns include at least one input mapped thereto. The first column specific RLE {0, 1, 1} indicate that the first column with an input mapped thereto includes a first cell without an input mapped thereto, a second cell with an input mapped thereto, and the remaining cells of the column do not have an input mapped thereto. The second column specific RLE {1, 1, 1} indicates that a first cell of the column includes an input mapped thereto, a second cell of the column does not include an input mapped thereto, and that the remaining cells of the column include an input mapped thereto.

FIG. 10 illustrates, by way of example, a diagram of an embodiment of a behavior transition matrix 1000. The behavior transition matrix 1000 is similar to a Markov model, but is provided empirically and based on the groups to which consecutive inputs are actually mapped. The behavior transition matrix indicates how likely it is, that a next input is mapped to a group v given that the current input is mapped to group w, where v is a member of the set of all groups and w is a member of the set of all groups of the SV grid. The behavior transition matrix 1000 can be generated using little processing and memory overhead and can be updated in real time.

The behavior transition matrix 1000 is for the SV grid 900. Based on the seven mapped inputs of the SV grid 900, there is a one third chance that the next input will be mapped to each of the respective groups of cells 804, 806, and 920. According to the behavior transition matrix 1000 there is a zero percent chance that, if an input is currently mapped to group 1 (the group of cells 804), the next input will be mapped to group 3 (the group 920). If such a transition is noticed, and even if the cell to which the input is mapped in group 3 is recognized (has had an input mapped thereto previously), an anomaly can be declared as the behavior of consecutive groups has not been seen before. Similarly, if a transition between groups is rare (e.g., below a specified probability, such as less than 0.50. 0.45, 0.40, 0.35, 0.30, 0.25, 0.20, 0.15, 0.10, 0.05, 0.01, some probability therebetween, or less than 0.01), it is not an anomaly since it has been seen before, but nonetheless it can be reported as potentially bad behavior.

Embodiments can determine a Gaussian Mixture Model (GMM) for a given group. The GMM of a given group can be used to help determine a probability of a given input being an anomaly. The GMM of a given group can also help determine a probability that a mapped input is a member of a group.

For example, consider the mapped inputs in cell 1-5, and the mapped inputs in cells 2-5 and 2-9 of the SV grid 900 of FIG. 9. It is more likely that the inputs mapped to the cell 1-5 are accurately in the same group (group of cells 804) than the inputs mapped to the cells 2-5 and 2-9. This is because of the proximity of the points and the tendency of encoding inputs into the SV grid 900 to clump like behaviors. It could be more likely that the point in cell 2-9 is a member of the group 920 than the group of cells 806. This highlights a tradeoff between simplicity in forming groups and the SV grid and getting the group membership correct. If it is more important that the group membership be correct, more processor bandwidth will be required to re-group cells (or mapped inputs) and maintain an accounting for the proper group membership. In many applications, however, it is sufficient to have less accurate group membership in the reporting and account for the improper group membership with post-processing (sometimes called classification).

Using techniques of embodiments can simplify a GMM calculation for a given group. A GMM is generally calculated using the transcendental exponential function. For example, a standard 2D Gaussian equation is given by Equation 17:

$$\text{Probability of point } (x, y) \text{ in group } z = e^{-0.5*\left(\frac{(x-xc)^2}{\text{sign } x} + \frac{(y-yc)^2}{\text{sign } y}\right)} \quad \text{Equation 17}$$

Where x and y correspond to the values of feature 1 and feature 2 to which the input maps, xc and yc are the feature 1 and feature 2 values of the center of the group z (e.g., the first point added to the group and about which the group was formed). Calculating the exponential function is complicated and prohibitively expensive for implementation on many lower bandwidth controllers. Equation 18 can be used as a quick, accurate approximation to the transcendental function of Equation 17:

$$\text{Probability of point } (x,y) \text{ in group } z = 1 - 0.2*((x-xc)*(x-xc)+yc)*(y-yc)) \quad \text{Equation 18}$$

Where x, y, yc, and xc are defined as in Equation 17. The calculation of the GMM using Equation 18 is simpler and faster than calculating the GMM using Equation 17. The GMM can be determined on a smaller, simpler processing unit using Equation 18.

Figure 11:
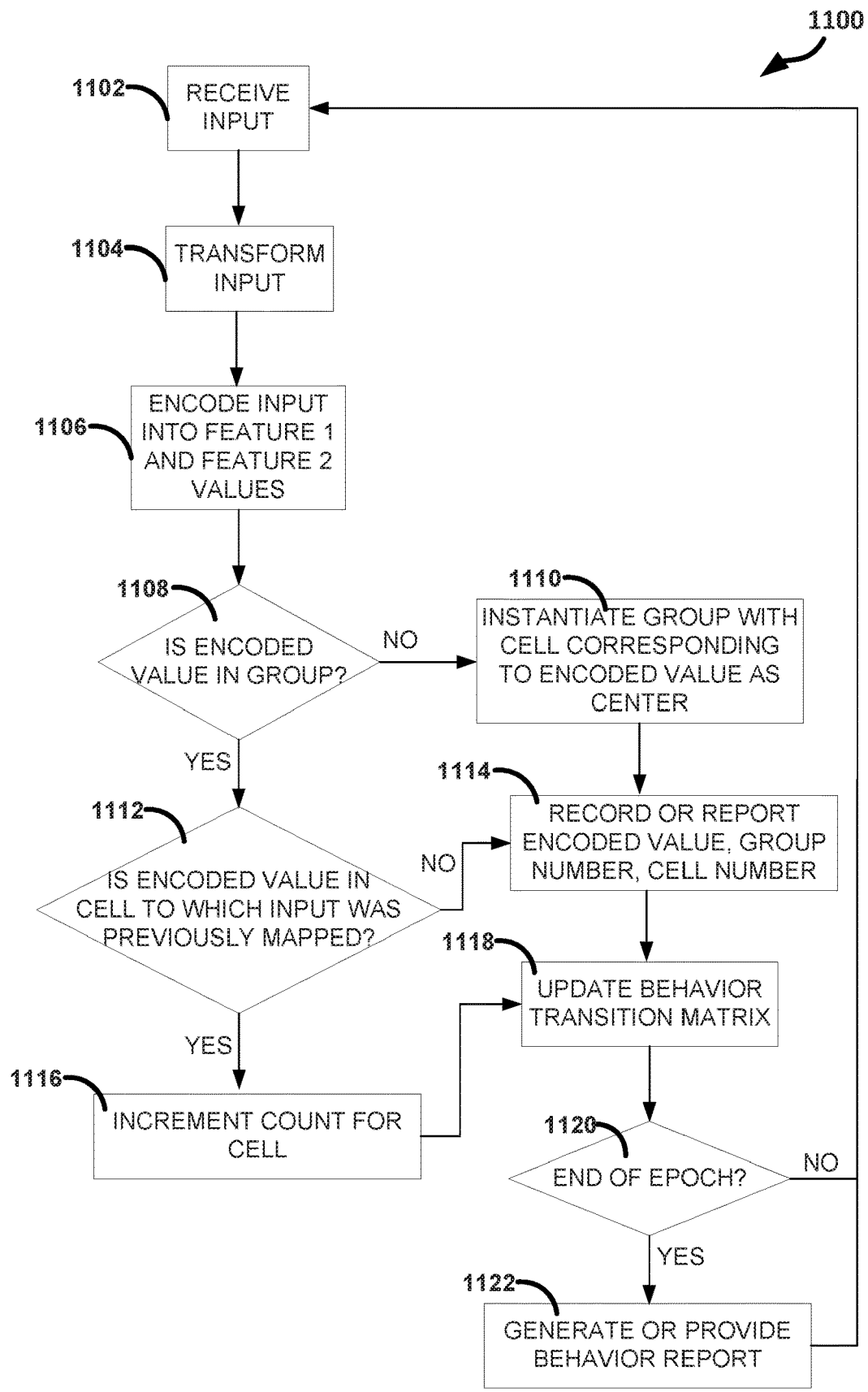
FIG. 11 illustrates, by way of example, a diagram of an embodiment of a method for behavior detection using AAG.

FIG. 11 illustrates, by way of example, a diagram of an embodiment of a method 1100 for behavior detection using AAG. The method 1100 as illustrated includes receiving an input, at operation 1102. The input can be a file, packet, data stream, a portion thereof, or the like. The input can be transformed, at operation 1104. The transformation at operation 1104 can convert the input to a numerical value. One such transformation is an ASCII encoding of the input. The operation 1104 may not be needed for numerical inputs, thus the operation 1104 is optional.

The operation 1106 includes encoding the transformed (or untransformed) input into two feature values, feature 1 and feature 2. As previously discussed, the feature values can include two different statistics on the same data or a same statistic on different (e.g., overlapping) data. The statistics, as previously discussed, can be order-dependent, such that the same numbers in a different order produce a different result for the given statistic.

It can be determined, at operation 1108, whether the encoded value falls within a group extent of a group that is already defined in an SV grid. The operation 1108 can include comparing the feature 1 value and the feature 2 value to a recorded extent of each group (e.g., in temporal or group number order). If the (feature 1, feature 2) falls outside of all groups, as determined at operation 1108, a new group can be instantiated at operation 1110. The new group can be instantiated to include an odd number of rows and an odd number of columns, such that the grid associated with the group includes a center cell. The cell to which the input is mapped can be at the center of the instantiated groups of cells. The mapped input can be recorded and used to determine the extent of the group (e.g., based on a cell size and a number of rows and columns of cells in the group).

If the encoded value is determined to fall within a group extent, at operation 1108, it can be determined whether the encoded value is within a cell to which an input was previously mapped, at operation 1112. After performing operation 1110, or after determining, at operation 1112, that the encoded value is not within a cell to which an input was previously mapped, data indicating the encoded value, group number, or cell number can be recorded or reported. The data can be reported in some embodiments that report more than at the end of each epoch. The data can be recorded in some embodiments that report at the end of each epoch. If the encoded value is determined, at operation 1112, to fall within an extent of a cell to which an input was previously mapped, a count for the cell (indicating the number of inputs that have been mapped thereto) can be incremented at operation 1116.

The operation 1118 is illustrated as occurring after the operations 1114 or 1116. However, the operation 1118 can occur before, after, or concurrently with the operations 1108, 1110, 1112, 1114, or 1116. The operation 1118 includes updating a behavior transition matrix, an example of such a matrix is provided in FIG. 10. At operation 1120, it can be determined if an end of an epoch has been reached. An epoch can last a specified amount of time, until a specified time, a specified number of inputs, a specified number of detected anomalies, a specified number of newly defined groups, or the like. If the end of the epoch is reached, as determined at operation 1120, a behavior report can be updated, generated, or transmitted. The behavior report can include an indication of new groups generated, anomalies and their associated cell numbers, encoded values, or the like, counts for each cell, the behavior transition matrix or a list indicating, in sequential order, groups to which each input was mapped for the epoch, parameters of the SV grid (e.g., cell extent, group extent (e.g., number of rows or columns of cells), or the like. In some embodiments, the SV grid can be offloaded to a child process, such as to start the child with the knowledge gained by the prior process regarding anomalous behavior.

AAG of embodiments uses a reference group defined from a single cell and achieves self-organizing grouping without respect to the reference SV group zero. AAG is capable of defining arbitrary numbers of groups on an unbounded 2D plane with finite amounts of memory. The memory can be off-loaded to progeny (a child). The memory can include new groups learned by the parent process. The memory offload can provide a sort of ancestral inheritance of new groups and old groups for reference groups. The AAG process of embodiments can scale to arbitrarily large bandwidth processing, can be distributed or implemented in a multithreaded fashion, and can organize large data spaces, like sensor output, into smaller important data chunks, such as for post processing.

Embodiments are provided for creating a Machine Intelligence (MI) alternative to ML based classifiers. Fast deployment (development and building) and using of classifiers is becoming increasingly important. There is a push for improved real-time embedded applications for making course-of-action and other decisions based on network/system state. Examples include embedded classifiers for 1553b bus, the Controller Area Network (CAN) bus, Military CAN (MilCAN) in support of military autonomous resupply vehicles, the Center for Accelerated Application Readiness (CAAR) program, as well as for discrimination and classification of moving targets as drones vs planes and fauna. Each of these areas requires a high-performance reliable classifier to be created and then deployed and used with an efficient computational footprint. Cyber network security can also benefit from an ability to postprocess anomalies and be able to classify intended or possible behaviors and also to predict upcoming packet types. Radar object recognition can fuse Doppler information to discern craft types and to later be able to gain awareness of meteorological meaning as weather evolves. SV for anomaly detection and data thinning has proven itself for small embedded applications as described but can be further leveraged to form the final step of a classifier for such devices and applications as well.

To date, many ML based classifier methods exist and are well understood. They are all limited by the No Free Lunch (NFL) Theorem and make the use of partial information problematic. The method can leverage SV in a multi-layer cascade approach.

The methods can leverage previously discussed ITM based compressive sensing encoding stats as well as SV RLE representation of SV grid spaces and SV AAG to achieve autonomous auto-grouping and partitioning of data spaces in unsupervised fashion. This approach serves as a standalone process with truth labels (sometimes called types) available for supervised training or as a processor of anomalies extracted during SV AAG anomaly identification and secondary reprocess of anomalous rows with labeling applied following human (e.g., a subject matter expert (SME)) designation. The result is each group discovered by SV AAG can be reprocessed using the original (but not limited to) encoding stats by simply zooming into each group making a new SV grid be a size (n×m) where n and m are odd size values for the allowed GROUP extent used by SV AAG. The resolved SV grid can be simply (nm)×(nm) or $(nm)^2$ in extent (a 9×9 extent group zooms into a 81×81 resolver SV grid) comprised of $(nm)^4$ possible cells.

A column of truth labels can be used as a test for confliction/de-confliction of cell member labels. If cells are pure they can be labeled accordingly. If conflicted, the group of cells can be flagged and a resolution increasing process can be repeated until deconfliction achieved. At any point a different combination of encoding stats may be used to achieve de-confliction with fewer cascades and it is permissible (but not required) to invoke optimization strategies to choose varying combinations of features to discover the set resulting in fewest number of cascades required for de-conflicted labels. Once all groups are comprised of singletons (single cell containing only 1 label type) the equivalent SV space can be represented with a global sparse SV RLE string which forms the classifier for testing new data against. This classifier retains the ability to declare anomalies when data being examined generates a new cell that does not exist in the classifier SV RLE.

The SV RLE forms a second set of strings that contain the labels or text associated with classification to be returned to the analyst. To keep SV grid group representation minimalistic and efficient, a new form of RLE representation can be introduced which eliminates the need for the SV RLE 4 tests (Extent, Row RLE, Col RLE, Specific Col RLE), and represents the SV groups by a single RLE of the raster scan cell index representing the group itself to a single Group-RLE test for presence or absence of a cell and to act as a pointer to an equivalently labeled string with description of the cell contents. The method is computationally fast and efficient and though can theoretically use many degrees of depth to zoom and resolve labels all examined data sets have resolved in 2 layers. The embodiments can be considered a deep learning method since it is not bounded to using strictly 2 resolving layers. The embodiments, however, are not ML, but rather MI embodiments as they are not bounded by the NFL theorem and use information theoretic methods.

Figure 12:
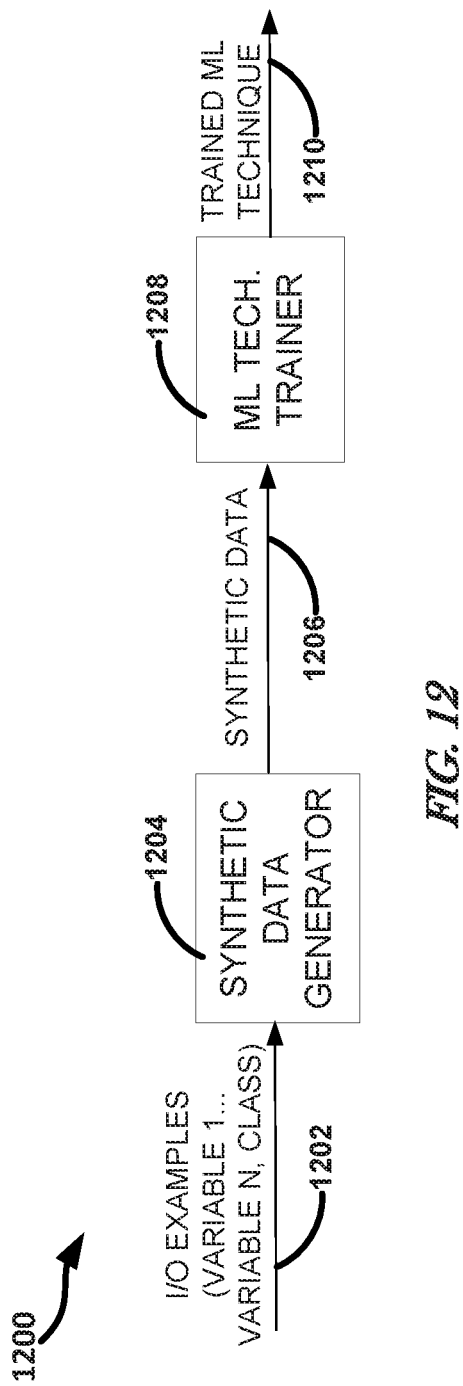
FIG. 12 illustrates, by way of example, a diagram of an embodiment of a system for synthetic data generation and ML training.

FIG. 12 illustrates, by way of example, a diagram of an embodiment of a system 1200 for synthetic data generation and ML training. The system 1200 as illustrated includes a synthetic data generator 104 and an ML technique trainer 1208. The synthetic data generator 1204 performs a Spatial Voting (SV) operation on I/O examples 1202 and generates synthetic data 106 based on the I/O examples 1202.

The I/O example 1202 (sometimes called input/output examples) include input data and can optionally include a class to which the input data is a member. The input data can include variables that can be output from one or more processes or devices. The processes or devices can be any of a wide range of sensors, firewalls, network traffic monitors, bus sniffers, or the like. The processes or devices can provide variable data in a wide variety of formats, such as alphanumeric, character, strictly numeric, list of characters or numbers, strictly alphabet, or the like. Any non-numeric input can be converted to a numeric value as part of the SV operation (see FIGS. 1-4 for further details).

Figure 13:
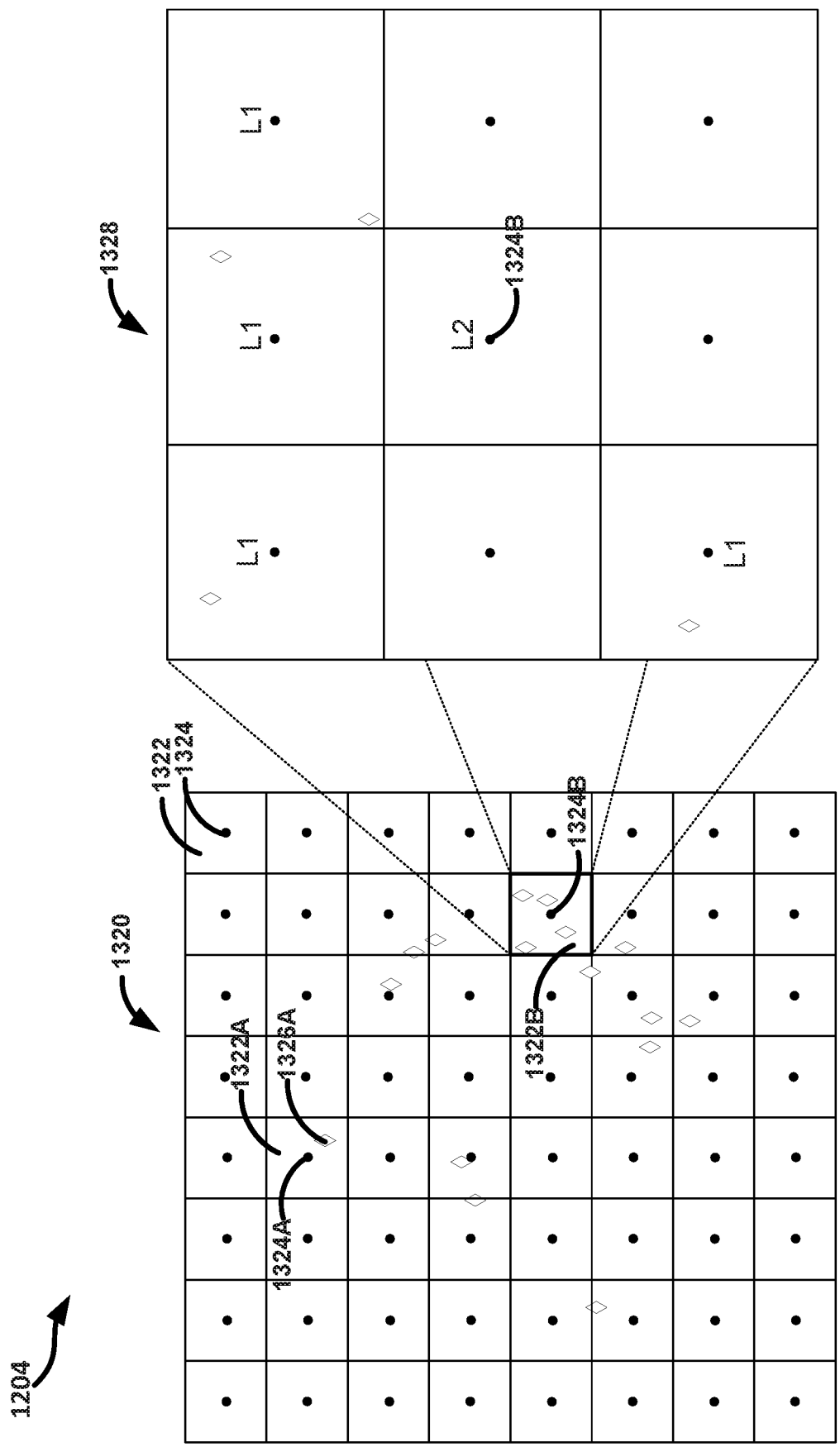
FIG. 13 illustrates, by way of example, a portion of a synthetic data generation process, such as can be performed by the SV data generator of FIG. 12.

FIG. 13 illustrates, by way of example, a portion of a synthetic data generation process, such as can be performed by the SV data generator 1204. The SV operation converts N-numeric values (feature vectors) to values of two features (same feature on different data or different features on same data) and maps the two features to an SV grid 1320. The SV grid 1320 includes cells 1322 (of equal size and extent) each with a corresponding cell center 1324. The cell center 1324 can serve as a convenient reference point for the cell 1322.

The diamonds 1326 represent respective locations to which an I/O example 1202 is mapped based on a determined feature. For more information regarding the types of features and other details of SV operations, please refer to FIGS. 1-4.

The synthetic data generator 1204 performs the SV operations and generates the synthetic data 1206. The synthetic data 1204 can include, for each cell, an average of all features of data mapped thereto. For a cell that includes only a single I/O example 1202 mapped thereto, the average is trivial and is just the value of the features (e.g., variables) of the I/O example represented by the diamond 1326. For example, the cell 1322A has only a single I/O example 1202 mapped thereto, so the synthetic data 1206 for the cell 1322A is the value of the variables of that I/O example 1202. The synthetic data 1206 can then be associated with the center 1324A of the cell.

The cell 1322B includes multiple I/O examples mapped thereto. In such a case, the individual variables are averaged per variable, to determine a single value for each variable to be associated with the center of the cell 1322B. Assume the I/O examples that map to the cell 1322B have the following values (along with an optional class):

| I/O Example | variable 1 | variable 2 | variable 3 | variable 4 | variable 5 | variable 6 |
|---|---|---|---|---|---|---|
| 1  | value 1 | value 5 | value 9  | value 13 | value 17 | value 21 |
| 7  | value 2 | value 6 | value 10 | value 14 | value 18 | value 22 |
| 11 | value 3 | value 7 | value 11 | value 15 | value 19 | value 23 |
| 16 | value 4 | value 8 | value 12 | value 16 | value 20 | value 24 |

Note that six variables per I/O example 1202 is merely an example, and more or fewer variables (e.g., features of a feature vector) can be used. The synthetic data value associated with the center 1324B can be the average of each value of the variable so the value of the synthetic data 106 for the cell 1322B in this example can be:

Synthetic Data=(Avg(value 1, value 2, value 3, value 4), Avg(value 5, value 6, value 7, value 8), Avg(value 9, value 10, value 11, value 12), Avg(value 13, value 14, value 15, value 16), Avg(value 17, value 18, value 19, value 20), Avg(value 21, value 22, value 23, value 24))

Avg can include the mean, expectation, median, mode, fusion of values, ensembling, lossy compression, or other average.

Like I/O examples 1202 can be voted to a same or nearby cell. This is, at least in part because the SV operation has the ability to vote similar I/O examples to same or nearby cells. The synthetic data 1206 generated at this point can be used as training data for an ML technique, such as by the ML technique trainer 1208 to generate a trained ML classifier 1210.

However, in some embodiments, the class of the I/O examples 1202 can be important or the synthetic data 1206 can be used in a specific process that requires more data analysis. In such embodiments, the mapped data (represented by the diamonds 1326) can be further processed.

Consider again, the cell 1322B and the four mapped data points. Also, assume that the respective classes associated with two or more of the four mapped data points are different. The cell 1322B can be further divided further into a sub-grid 1328. The number of cells in a row and column of the sub-grid 1328 can be rounded up to the nearest odd integer, and determined by the following equation:

maximum(3,sqrt(number of points mapped to cell))

The centers 1324B of the grids 1320, 1328 can correspond to the same point, while the remaining centers of the sub-grid 1328 correspond to different points. The variables of I/O examples 1202 mapped to a same cell 1322 can be averaged (in the same manner as discussed previously) to generate the synthetic data 1206 for that cell.

In the example of FIG. 13, all the cells of the grid 1328 include only a single point mapped thereto, thus there is no class conflict and the process can end. However, further sub-dividing of the grid can be required in some examples to remove class conflicts.

The synthetic data 1206 from the grid 1320 is sometimes called L2 synthetic data and the synthetic data 106 from the grid 1328 is sometimes called L1 synthetic data. In examples in which data mapped to a cell in the grid 1328 includes disparate classes, the cell can be further subdivided until the data in each cell no longer includes a conflicting class designation. In such examples, the synthetic data from the final subdivided grid is considered L1 synthetic data and the synthetic data from the immediately prior grid is considered L2 synthetic data. The L1 and L2 synthetic data labels can be used as classes for deconfliction.

Figure 14:
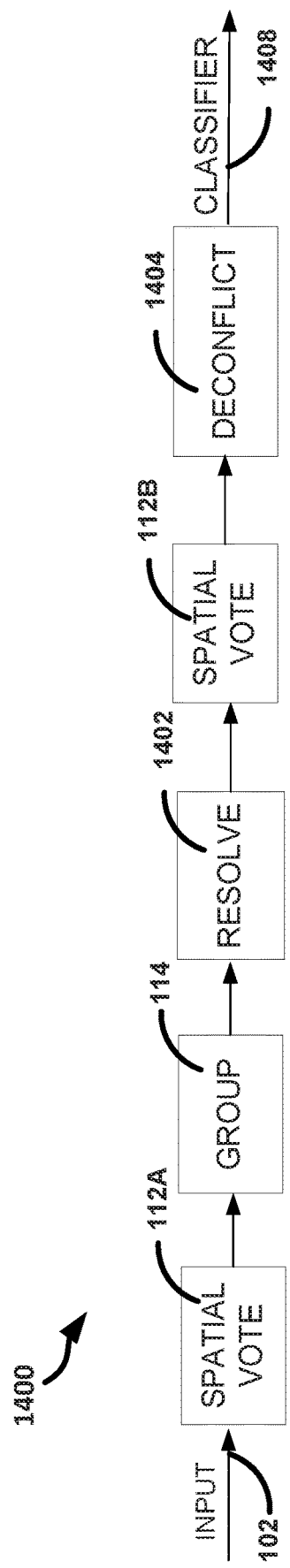
FIG. 14 illustrates, by way of example, a diagram of an embodiment of a method for classification using cascaded SV grids.

FIG. 14 illustrates, by way of example, a diagram of an embodiment of a method 1400 for classification using cascaded SV grids. The method 1400 includes receiving the input 102. The input 102 can be raw data, such as numerical, textual, or the like. As discussed previously, the input 102, if not numeric, can be converted to a number. The numeric representation of the input 102 can be spatially voted at operation 112A. The operation 112A is discussed in more detail regarding previous FIGS. Generally, the operation 112A can include mapping the input 102 (or a statistic determined based on the input 102) to a cell of a grid of cells. The grid of cells can be one dimensional (sometimes called a histogram), 2D (sometimes called a grid), or even higher-dimensional.

At operation 114, the spatially voted input can be grouped. The operation 114 is discussed in more detail regarding FIG. 8, 9 and others. The operation 114, in general, can include splitting the spatially voted input by proximity in voted space. Those points mapped (spatially voted) near each other tend to be mapped to a same group, while those points mapped further from each other tend to be mapped to a different group.

At operation 1402, each of the groups is resolved. The operation 1402, sometimes called resolving, can include dividing one or more cells of the grid of cells into grids of sub-cells until (i) a number of cells that has an input mapped thereto is the same as (ii) a number of cells that has an input mapped thereto in a prior division. The operation 1402 is discussed further regarding FIG. 15.

After the operation 1402, the operation 112B can be performed on the resolved data points. The grid of cells to which the resolved data points are spatially voted can include more cells than the resolved grid of cells that is produced as a result of the operation 1402. The resolution and cascading spatial voting of the operations 112A, 112B is discussed further regarding FIG. 16.

At operation 1404, the further spatially voted points from operation 112B can be deconflicted. The operation 1404 can include determining whether points voted to a same cell of the grid of cells have a same classification. The classification can be provided by a human or a machine. The classification can indicate a class of which the input 102 is a member (if the class has been provided). If all of the points mapped to a cell (after the operation 112B) has a same classification or one or more of the points has only a single classification and the remaining point have no label associated therewith, that cell can be considered deconflicted. If any of the points mapped to a cell (after the operation 112B) has a different classification than any other points mapped to that same cell, that cell is considered conflicted. The operation 1404 can be performed until all cells of the grid of cells are deconflicted. The operation 1404 is discussed in more detail regarding FIGS. 17 and 18.

The result of the operation 1404 can provide a classifier 1408. The classifier 1408 can comprise the SV grids generated performing the operations of FIG. 14. The classifier 1408 can receive input, spatially vote the input to the generated SV grids, and determine a classification for the input (or indicate that the classification is not possible currently).

Figure 15:
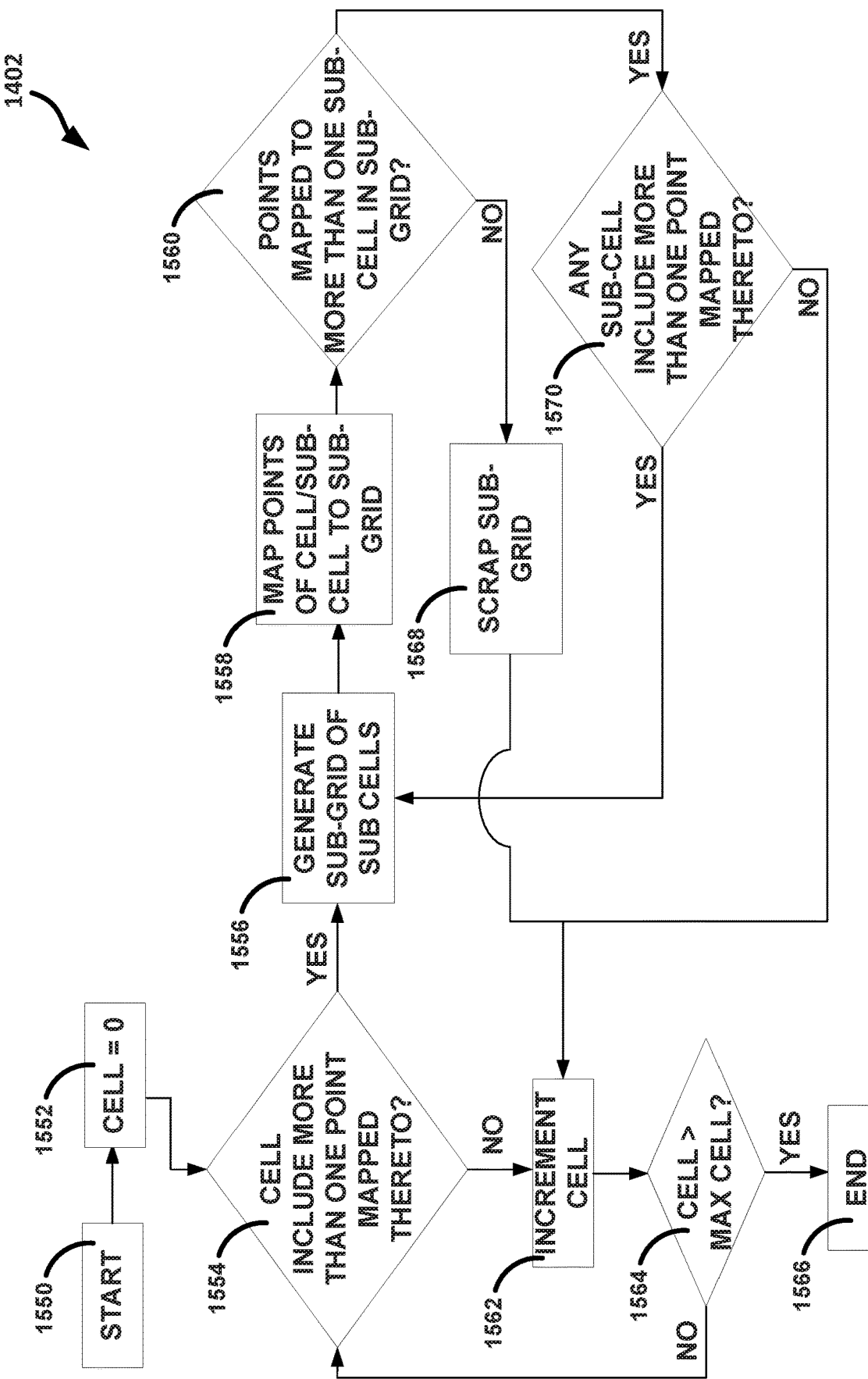
FIG. 15 illustrates, by way of example, a flow diagram of performing a resolving operation.

FIG. 15 illustrates, by way of example, a flow diagram of performing the operation 1402. The operation 1402 begins at operation 1550. At operation 1552, a cell identifier is initialized. In the example of FIG. 15, the initial value is 0. At operation 1554, it is determined whether the cell corresponding to the cell identifier includes multiple points mapped thereto. If so, the cell corresponding to the cell identifier can be divided into a sub-grid of sub cells, at operation 1556. At operation 1558, the points mapped to the cell corresponding to the cell identifier are mapped to the sub-grid of sub cells.

At operation 1560, it is determined whether the points mapped to the sub-grid of sub cells map to more than one sub-cell. If not, the sub-grid is scrapped at operation 1568. The SV grid containing the cell is defined to be the cell corresponding to the cell identifier without the sub-grid of sub-cells. If so, it is determined whether any sub-cell in the sub grid of sub-cells includes more than one point mapped thereto, at operation 1570. For each sub-cell determined to include more than one point mapped thereto at operation 1570, the operation 1556 can be performed on each of the sub-cells that includes more than one point mapped thereto.

If it is determined, at operation 1570, that no sub-cell includes more than one point mapped thereto, an operation 1562 can be performed. The operation 1562 can be performed if either (i) it is determined the cell corresponding to the cell identifier includes only one point mapped thereto, at operation 1554; (ii) the operation 1568 is performed; or (iii) it is determined that no sub-cell includes more than one point mapped thereto, at operation 1570.

At operation 1562, the cell identifier can be incremented. At operation 1564, it is determined whether the cell identifier is greater (or equal to) a maximum cell identifier value. If the cell identifier is not greater than (or equal to) the maximum cell identifier value, operation 1554 is performed and the operation 1402 continues. If the cell identifier is greater than (or equal to) the maximum cell identifier value the operation 1402 ends, at operation 1566.

Figure 16:
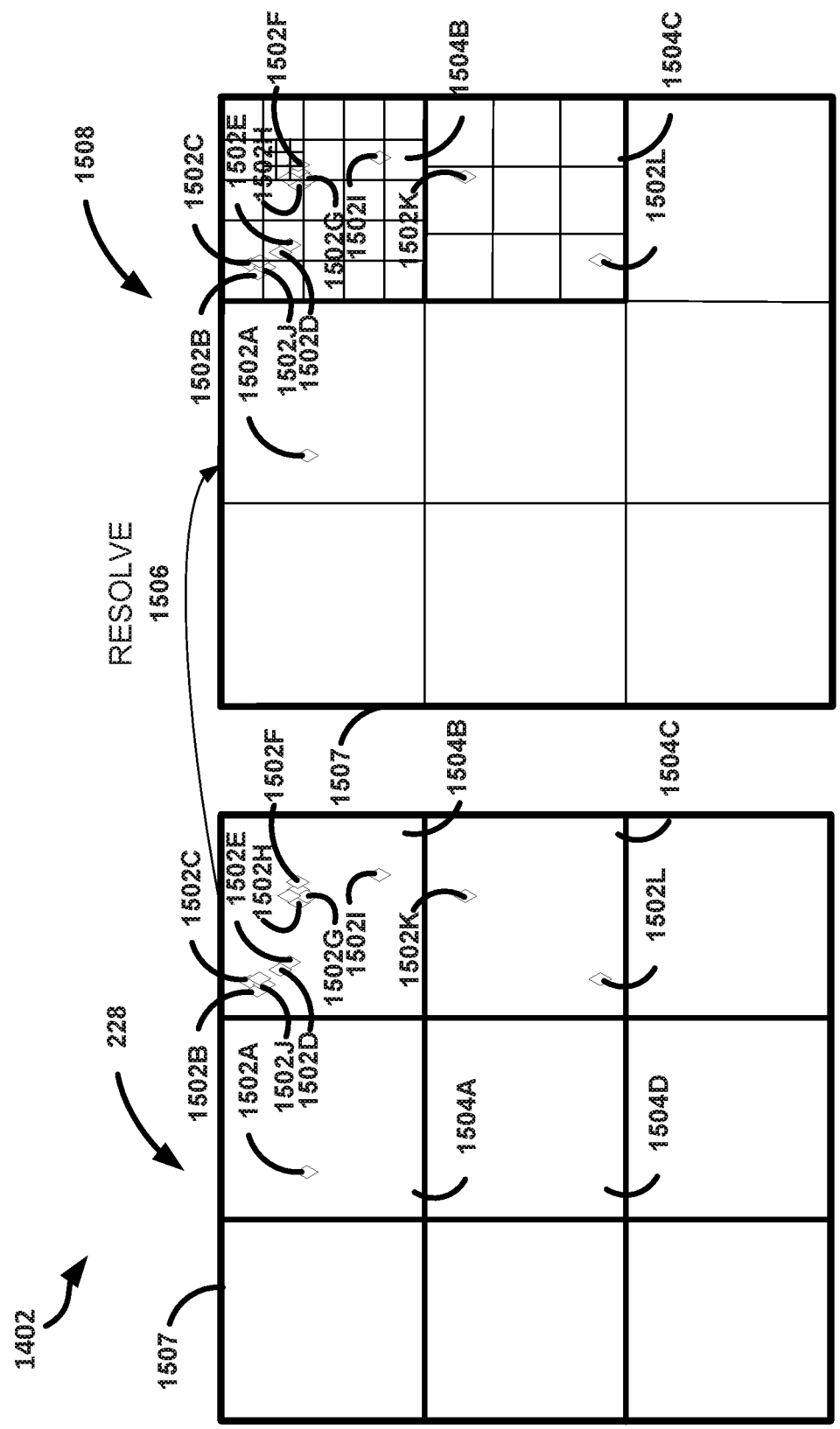
FIG. 16 illustrates, by way of example, a diagram of an embodiment of performing the resolving operation.

FIG. 16 illustrates, by way of example, a diagram of an embodiment of performing the operation 1402. The operation 1402 includes increasing a resolution (reducing a size) of cells of the grid of cells 228 that include multiple points mapped thereto. The operation 1402 can be performed after grouping the cells at operation 114. A group 1507 is illustrated in FIG. 16. The resolution can be increased by a predetermined amount, repeatedly, until a number of cells of a grid occupied is the same in consecutive iterations. Increasing the resolution can include populating a conflicted cell with a grid of cells, where the sub-cells combine to span the entirety of the conflicted cell. The resolution of the sub-cells is greater than the resolution of the conflicted cell.

Consider the grid of cells 228 of FIG. 16. The grid of cells includes points 1502A, 1502B, 1502C, 1502D, 1502E, 1502F, 1502G, 1502H, 1502I, 1502J, 1502K, 1502L mapped to three different cells 1504A, 1504B, 1504C thereof. At operation 1506, a resolution of cells 1504B, 1504C can be increased to generate a grid of cells 1508 in which the cells 1504B, 1504C are now populated with grids of sub-cells. In some embodiments, an extent of each sub-cell of the grid of cells 228 can be reduced by a specified amount to be comprised of a grid of sub-cells. In the example of FIG. 16, the extent of the cell 1504B of the grid of cells 1508 is reduced to 1/25 the extent of the sub-cells in the grid of cells 228 (while keeping the corners of the cell 1504B in the grids of cells 228, 1508 the same). The extent of some of the sub-cells of the grid of cells 1508 is reduced to 1/225 (1/25 then 1/9) from the cells original extent in the grid of cells 228. The extent of the sub-cells of the cell 1504C of the grid of cells 1508 is reduced to 1/9 its extent in the grid of cells 228. The increased resolution increases the number of cells in the grid while keeping the overall extent of the grid of cells 1508 the same as the grid of cells 228. The reduction in extent (increase in resolution) can include determining a ceiling of a square root of the number of cells mapped to the cell and rounding the result to a nearest, higher odd integer (if the result is not an odd integer). The nearest odd number is then used as the number of rows and the number of columns in the higher resolution version of the cell. Note that the grid of cells 1508 is non-uniform as the resolutions of the cells 1504B, 1504C, and the remaining cells are all respectively different.

The operation 1402 can include determining a number of sub-cells of the cells 1504B, 1504C occupied by data points 1502A-1502L. In the example of FIG. 15, the data points 1502B-1502I of the cell 1504B occupy seven sub-cells. The seven sub-cells occupied in the cell 1504B is greater than the single cell occupied by those same points in the cell 1504B grid of cells 228. The operation 1506 of increasing the resolution can be repeated until either the number of cells occupied after increasing the resolution (performing the operation 1506) is the same as the number of cells that were occupied before increasing the resolution or each cell that is occupied includes only a single point mapped thereto.

Note that while FIG. 16 illustrates increasing the resolution by 9X and 25X by operation 1506, other amounts of resolution can be used, such as a greater or lesser amount of resolution per execution of the operation 1506.

Figure 17:
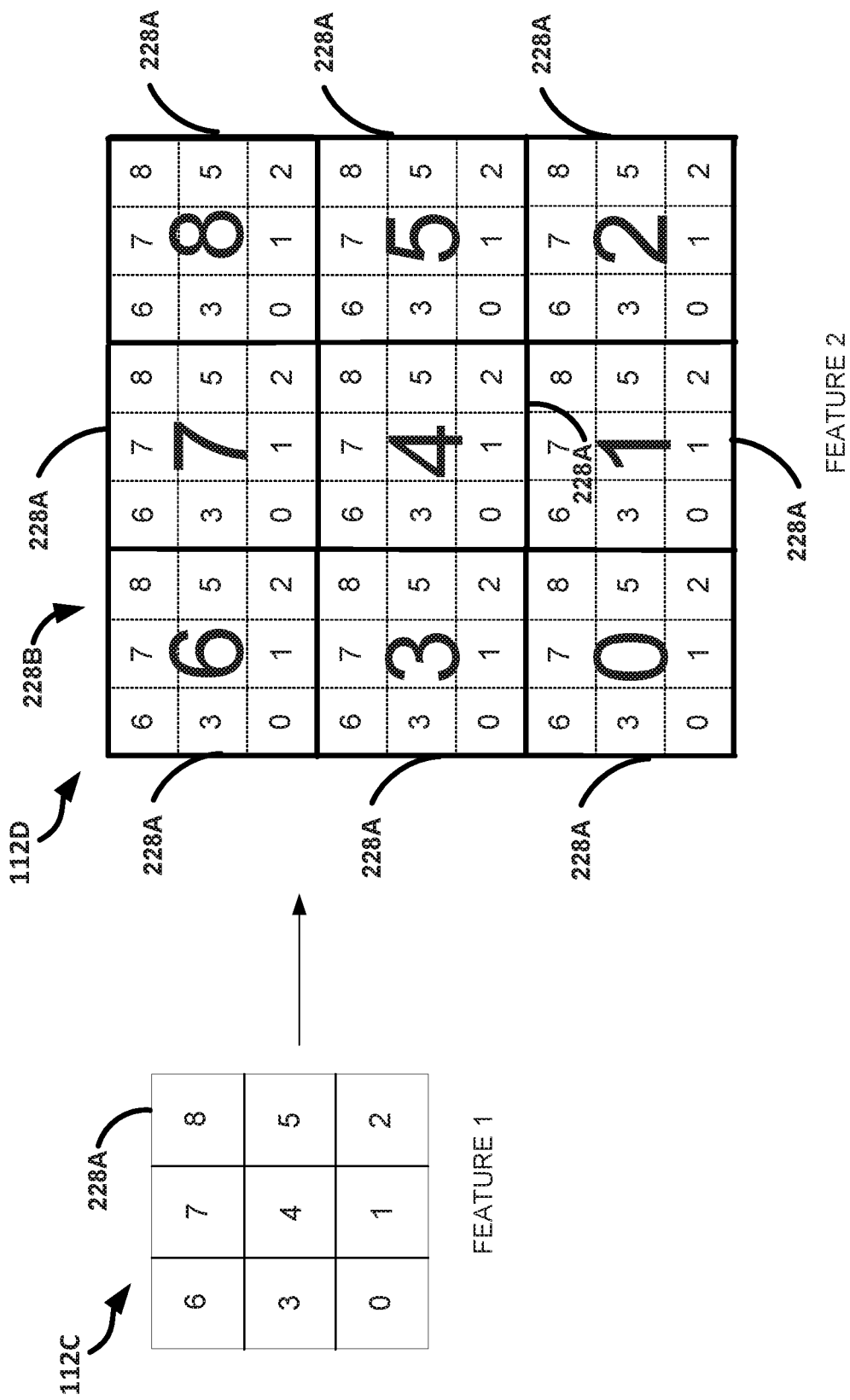
FIG. 17 illustrates, by way of example, a conceptual flow diagram of an embodiment of embedding SV grids.

FIG. 17 illustrates, by way of example, a conceptual flow diagram of an embodiment of embedding SV grids. In the embodiment of FIG. 17, features are mapped to two-dimensional SV grids, however, the concepts are equally applicable to SV grids of greater or lesser dimensions. At operation 112C, a first feature is spatially voted to an SV grid of cells 228A. In the example of FIG. 17, each feature is mapped to one of nine cells (sometimes called bins in the context of histograms). The grid of cells 228A is considered a lowest level of an embedded SV grid.

At operation 112D, a second feature is mapped to an SV grid of cells that includes the first feature and the second feature mapped thereto. The SV grid 228A is mapped to each cell of the grid of cells 228B.

Figure 18:
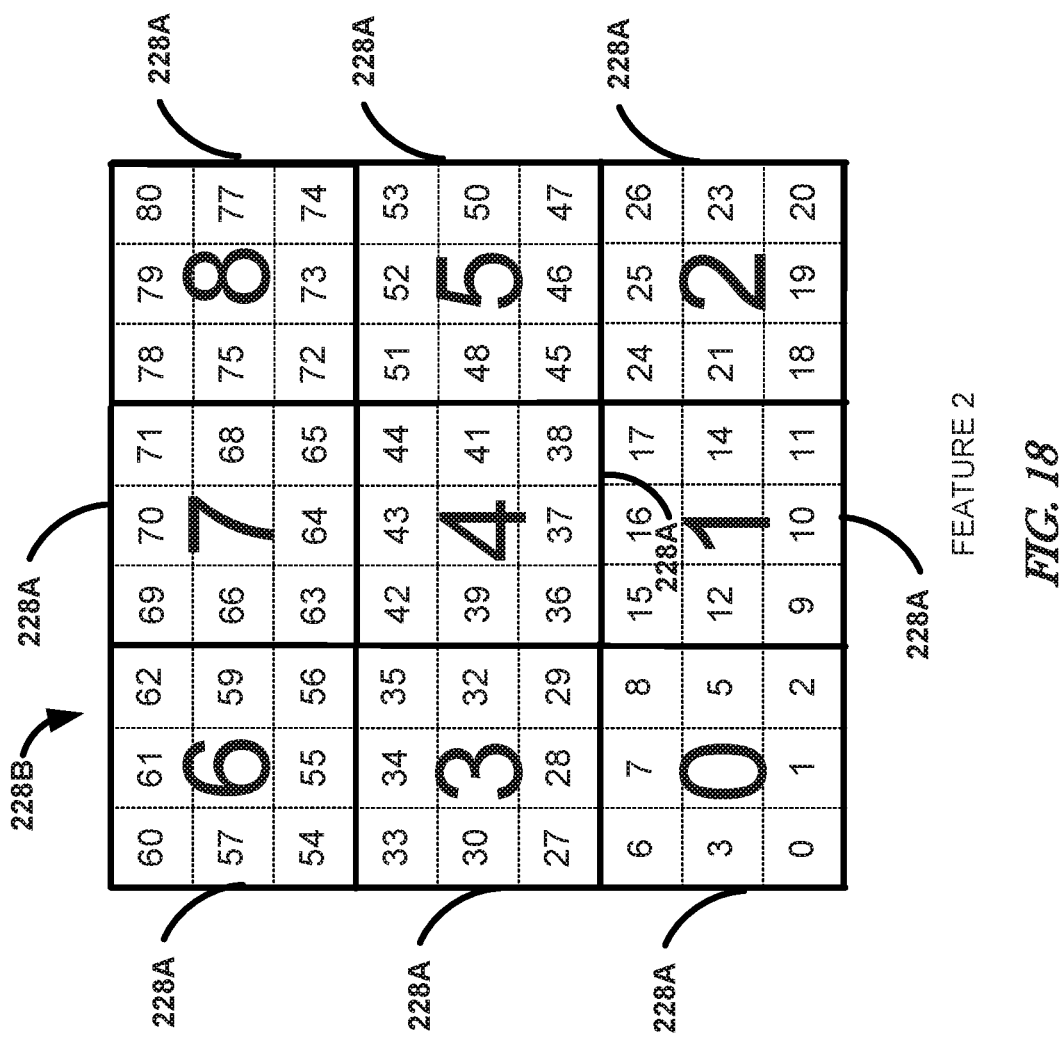
FIG. 18 illustrates, by way of example, a diagram of an embodiment of the embedded SV grids of FIG. 17 with a numbering of a virtual global resolution.

FIG. 18 illustrates, by way of example, a diagram of an embodiment of a virtual global resolution of cells. The operation 112D can be performed by virtually increasing a resolution of the SV grid of cells 112D to generate an SV grid of cells 228B with a virtual global resolution. The virtual global resolution numbering is illustrated in FIG. 18.

The second feature can be mapped to the grid of cells 228B at a location corresponding to (1) the key value corresponding to the second feature and (2) within the cell of the virtual global resolution corresponding to the key value to which the first feature was mapped. Thus, if the first feature is mapped to three and the second feature is mapped to seven, the operation 112D maps the second feature to a cell corresponding to a key value of sixty-six (66). The key value 66 corresponds to the second feature being mapped to the cell of the grid of cells 228B corresponding to key value 7. Within the cell corresponding to key value of 7, 66 corresponds to the left column, middle row thereof, the same cell the first feature is mapped to (in this example, 3) in the grid of cells 228A.

The cells to which an input has been mapped at each level of an embedded SV grid of cells can be determined based on the key value to which the input in the virtual global resolution of cells. Note that the example in FIGS. 17 and 18 corresponds to a single embedding with the SV grid of cells 112C corresponding to a first level of the embedding and the SV grid of cells 112D corresponding to a second level of the embedding. If a third SV grid of cells were to be part of the embedding, it would be considered a third level of the embedding. The highest-level number in the embedding is considered the top level and the first level is considered the bottom level. An SV grid at a higher level will have a corresponding virtual global resolution with more key values than an SV grid at a lower level (an SV grid closer to the bottom level). To determine which key values of the grid of cells to which the second feature is mapped and the grid of cells to which the first feature is mapped, a simple mathematical procedure can be performed. This procedure is:

(1) start with the highest-level SV grid of cells;
(2) divide the key value in the current level's virtual global resolution by the number of key values in the (current level minus 1) embedded grid of cells to generate an intermediate value;
(3) floor the intermediate value to determine the key value in the current level of the embedded grids of cells to which the input was mapped;
(4) if current embedding level is greater than 1, subtract, from the key value in the virtual global resolution, the key value times (the number of cells in the current grid of cells left to determine) and use that result as the key value for a next iteration to determine a key value to which an immediately previous feature was mapped, if not then all feature key values are determined and the work is done;
(5) repeat operations 2-4.

Consider an example in which each of three features of the input 102 is mapped to nine possible key values and the SV grids are embedded. Consider further that the first feature is mapped to key value 3, the second feature is mapped to key value 7, and the third feature is mapped to key value 1. The resulting key value in the virtual global resolution, after spatial voting the features and embedding the grids of cells, would be one hundred forty-seven (147).

To determine which key value the third feature was mapped to, take 147 and divide by 9*9=147/81=1.81. Remember that the possible number of key values to which each feature is mapped is 9 in this example and the number of features to be determined is 3 in this example. 3 minus 1 is 2. The floor of 1.81 is 1. Thus, the key value to which the third feature was mapped is 1. Now, there are two more key values left to determine, so subtract 1*9*9 (the key value of the third feature times the number of key values for the third grid (9) raised to the number of key values left to determine (2)) from 147 to get 66 and repeat steps 2-4.

In this example, take 66 and divide by 9=66/9=7.33. Remember that the possible number of key values to which each feature is mapped is 9 and the number of features left to be determined is 2. 2 minus 1 is 1. The floor of 7.33 is 7.

Thus, the key value to which the second feature was mapped is 7. Now, there is one more key value left to determine, so subtract 7*9 (the key value of the third feature times the number of key values in the SV grid of cells of the second feature raised to the number of key values left to determine) from 66 to get 3 and repeat steps 2-4. The last key value is determined as 3.

By embedding the SV grids as in FIGS. 17 and 18, an improved SV grid representation efficiency, in terms of memory space is consumed and anomaly testing computations can be realized. The memory efficiency improves upon storing SV grids as RLE representations as discussed regarding FIGS. 5 and 6. With an embedded SV grid, the extent of each of the cells of the SV grid, minimum and maximum values of each of the features, and the like can be stored (as before) but the RLE representation can be simplified. The only number needed to indicate all three feature values is the key value in the highest level virtual global resolution. In this example, 147. To encode this value, the RLE can be "0, 147, 1" can stored to indicate that starting at value "0", 147 occurrences of 0 occur (keys 0 to 146) and then 1 key value is populated (the $147^{th}$ key), and no further keys are populated. This is an improvement over storing a column RLE, row RLE, and column-specific RLE for each of the SV grids.

The test of FIG. 6 is then reduced to a mere comparison to the recorded RLE key values. If a key value is in the list of key values represented by the RLE, it is deemed recognized and a type associated with the cell can be returned as the class of the input. If the key value is not in the list of key values the input can be deemed an anomaly.

A feature value at each level of the embedded SV grids of cells can be determined as a center value of the cell corresponding to the key value. The center value can be determined as feature value=minimum of feature value+ (maximum of feature value—minimum of feature value)* (key value+0.5)/number of key values in SV grid of cells within the feature (not the virtual global resolution of the grid of cells).

Figure 19:
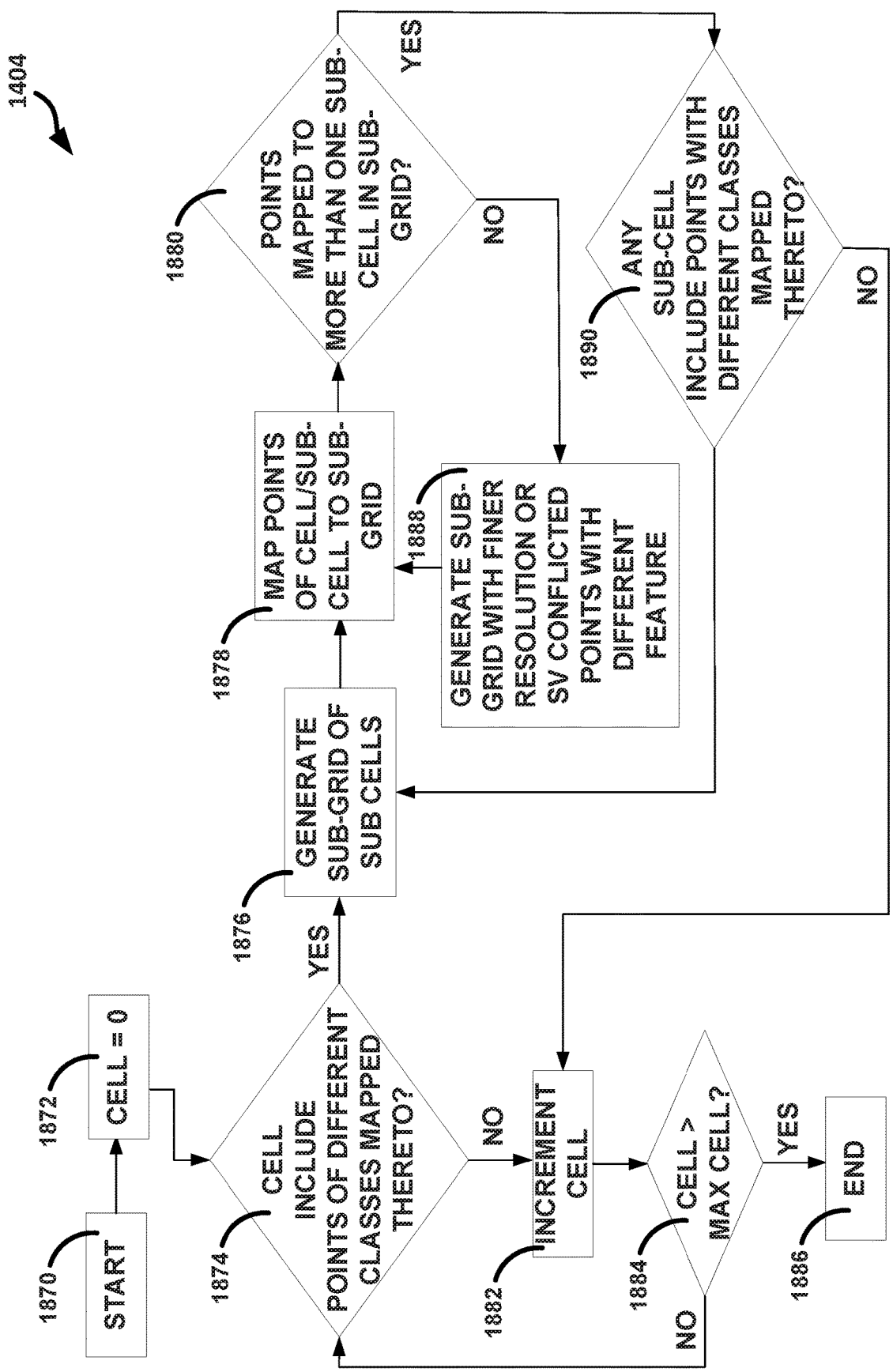
FIG. 19 illustrates, by way of example, a flow diagram of performing a deconflict operation.

FIG. 19 illustrates, by way of example, a flow diagram of performing the operation 1404. The operation 1404 begins at operation 1870. At operation 1872, a cell identifier is initialized. In the example of FIG. 19, the initial value is 0. At operation 1874, it is determined whether the cell corresponding to the cell identifier includes points of different classes mapped thereto. If so, the cell corresponding to the cell identifier can be divided into a sub-grid of sub cells, at operation 1876. At operation 1878, the points mapped to the cell corresponding to the cell identifier are mapped to the sub-grid of sub cells.

At operation 1880, it is determined whether the points mapped to the sub-grid of sub cells map to more than one sub-cell. If not, a sub-grid of finer resolution than the one generated at operation 1876 is generated and the operation 1404 continues at operation 1878, or another round of SV (operation 112) can be performed to further distinguish the data. If so, it is determined whether any sub-cell in the sub grid of sub-cells includes more than one point mapped thereto. If so, the operation is performed 1876 on the sub-cell that includes more than one point mapped thereto. If it is determined, at operation 1890, that no sub-cell includes cell of different classes mapped thereto, an operation 1882 can be performed.

At operation 1882, the cell identifier can be incremented. At operation 1884, it is determined whether the cell identifier is greater than (or equal to) a maximum cell identifier value. If the cell identifier is not greater than (or equal to) the maximum cell identifier value, operation 1884 is performed and the operation 1404 continues. If the cell identifier is greater than (or equal to) the maximum cell identifier value the operation 1404 ends, at operation 1886.

It is possible to have data that maps to a same cell have different classification. This can occur with an error in classifying the data, managing the data, or the like.

Figure 20:
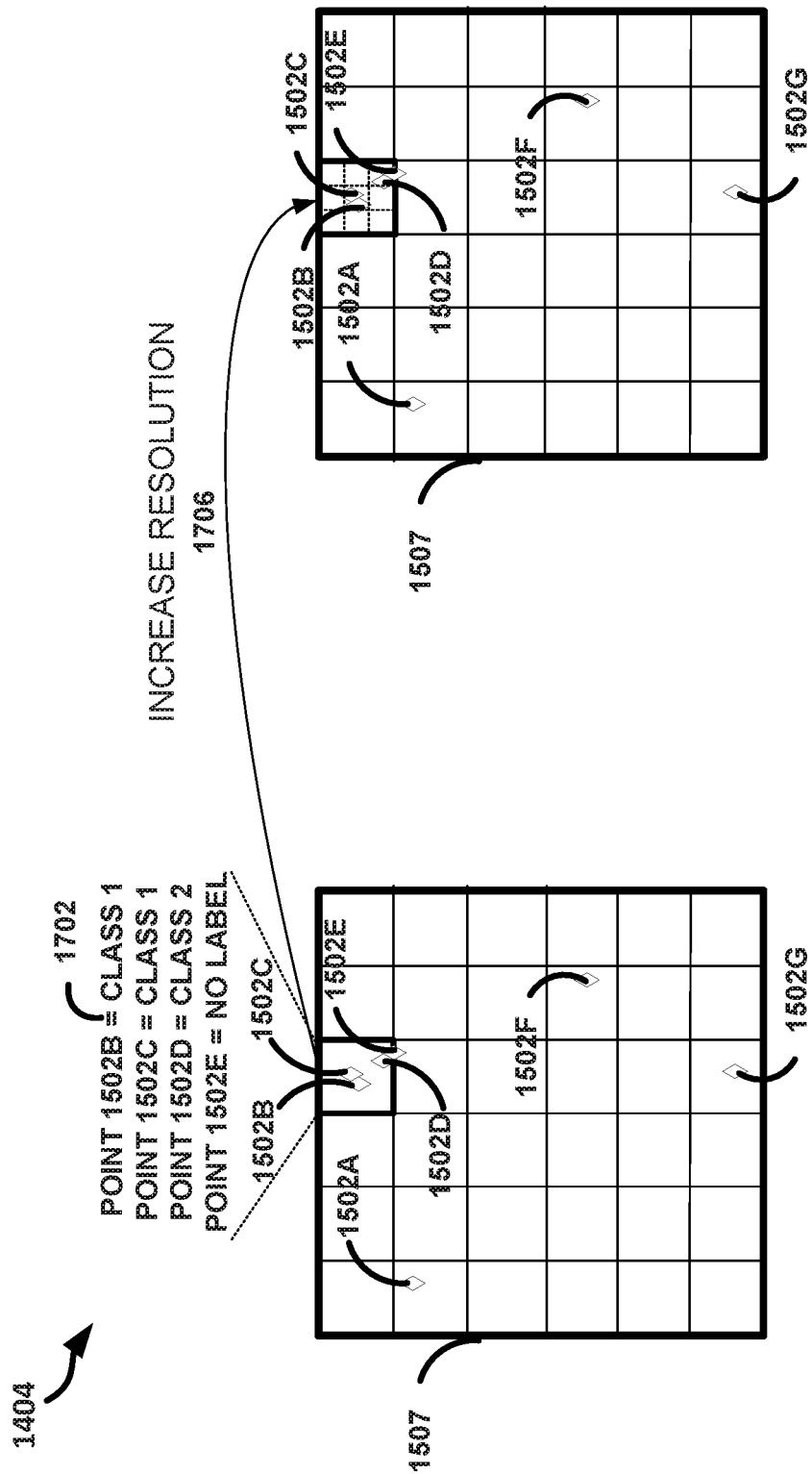
FIG. 20 illustrates, by way of example, a diagram of an embodiment of performing the operation 1404 (deconflict) of FIG. 14.

FIG. 20 illustrates, by way of example, a diagram of an embodiment of performing the operation 1404 (deconflict) of FIG. 14. The operation 1404 can include comparing classes 1702 of points mapped to a same cell. If, for a given cell, the classes of the points mapped to that cell are the same, then no deconfliction is needed. If a cell includes points of multiple classes mapped thereto, the resolution of that cell can be increased by performing the operation 1706. The operation 1706 can be similar to the operation 1506, with the operation 1706 including different stopping criteria. The stopping criteria from the operation 1706 can include determining that no cells include points of multiple classes mapped thereto. In the operation 1706, the number of columns and rows of a grid of sub-cells can be a square root of the number of points mapped to the cell rounded up to the nearest odd integer (if the result of the square root is not an odd integer). The operation 1706 can be performed until no cell includes points of multiple classes mapped thereto. When the grid of cells includes no cells with points of different classes mapped thereto, the grid of cells can be considered deconflicted. In the example of FIG. 20, the points 1502A, 1502B deconflict from the points 1502D, 1502E to different cells.

A special case occurs where a cell has at least one point with a class label and at least one point without a class label mapped thereto. In the example of FIG. 20, after one iteration of the operation 1706 the points 1502D and 1502E are mapped to a same cell. The point 1502D has a class label of class 2, and the point 1502E has no class label. These points can be considered deconflicted, but possibly not resolved. This is because, it is unknown whether the unlabeled point is of the class labelled in the other points in the cell. In such a case, the operation 1402 can be performed on the cell to determine whether the point that is labelled will resolve to a different cell than any points that are labelled. As previously discussed, the resolution process can end when the number of cells occupied in an iteration is the same as the number of cells occupied in an immediately previous iteration.

Figure 21:
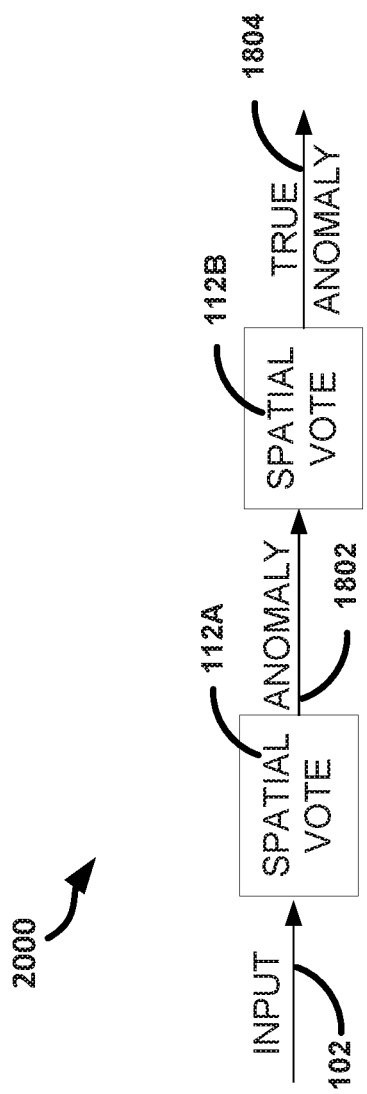
FIG. 21 illustrates, by way of example, a block diagram of an embodiment of a system for anomaly detection.

FIG. 21 illustrates, by way of example, a block diagram of an embodiment of a system 2000 for anomaly detection. The system 2000 includes multiple iterations of Spatial Voting operations 112A, 112B. The first operation 112A can be performed on one or more features of the input 102 to identify anomalies 1802. This is discussed in more detail regarding FIGS. 1-5. The identified anomalies 1802 can then be processed by another spatial voting operation 112B to identify true anomalies 1804. The spatial voting operation 112B can include determining additional features of the input 102 determined to be anomalies 1802, encoding only a portion of the input 102 determined to be anomalies 1802 and determining features based on only the encoded portion, or the like. The result is detection of true anomalies 1804.

The multi-level SV system 2000 can help distinguish between things that are irrelevantly different and things that are different in a consequential way. For example, consider the input 102 as data packets provided to a device. The port of the data packets may be irrelevant, but other portions of the data packet may be consequential. However, the port of the data packets may cause data packets that have a same payload, Machine Access Control number, or the like, to be voted to different cells of the SV grid. By reprocessing only a portion of the input 102 corresponding to the anomalies 1802 using the SV operation 112B, the port number can be removed from the determination of features and prohibited from affecting the SV operation 112B. The system 2000 can thus help distinguish between important anomalies and non-consequential anomalies.

Figure 22:
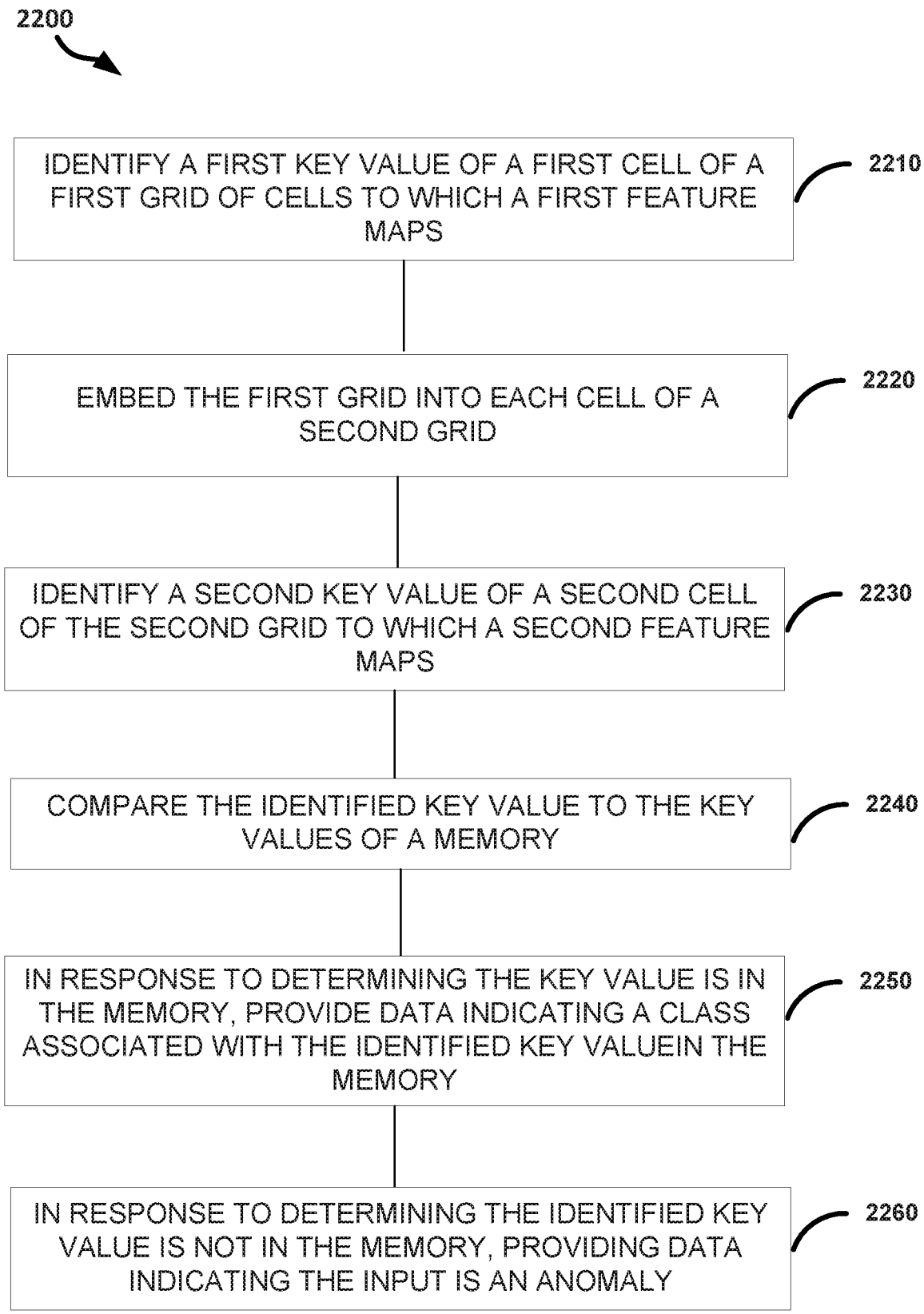
FIG. 22 illustrates, by way of example, a diagram of an embodiment of a method for classification using cascaded SV grids.

FIG. 22 illustrates, by way of example, a diagram of an embodiment of a method 2200 for classification using cascaded SV grids. The method 2200 as illustrated includes identifying a first key value of a first cell of a first grid of grids of cells to which a first feature maps, at operation 2210; cascading the first grid with a second grid of the grids of cells by embedding the first grid into each cell of the second grid, at operation 2220; identifying a second key value of a second cell of the second grid to which a second feature maps, the second key value representative of the first and second key values, at operation 2230; comparing the identified key value to the key values of a memory, at operation 2240; in response to determining the identified key value is in the memory, providing data indicating a class associated with the identified key value in the memory, at operation 2250; and in response to determining the identified key value is not in the memory, providing data indicating the input is an anomaly, at operation 2260.

The method 2200 can further include determining the cell size, the number of columns of cells, the number of rows of cells, and the key values of the grids of cells. The method 2200 can further include mapping other inputs including respective classes associated therewith to the first grid and resolving the first grid.

The method 2200 can further include cascading, wherein resolving the first grid includes increasing a resolution of a cell of the first grid by embedding a grid of sub-cells in the cell. The method 2200 can further include, wherein resolving the first grid includes increasing the resolution of the cell until a number of sub-cells of the cell with an input mapped thereto at a first iteration is the same as the number of sub-cells of the cell with an input thereto at a second, immediately subsequent iteration.

The method 2200 can further include deconflicting the second grid. The method 2200 can further include, wherein deconflicting the second grid includes, if a cell of the cells of the second grid includes inputs mapped thereto increasing a resolution of the cell by embedding a grid of sub-cells in the cell. The method 2200 can further include, wherein deconflicting the SV grid further includes iteratively cascading and increasing the resolution of the second grid until all cells with multiple inputs mapped thereto include only a single class associated therewith.

A use case of embodiments can include a high side entity and a low side entity. The high side entity has access to data that has a clearance level that is higher than the clearance level obtained by the low side entity. The high side entity can perform operation 112A on the classified data. The operation 112A can provide no indication of the actual contents of the classified data. The results of the operation 112A can be provided to the low side entity. The low side entity can then perform the operation 1402 on the classified data and provide the results to the entity with high side clearance. The high side entity can then perform the operation 112B or indicate a classification for one or more of the points. The low side entity can then perform deconfliction (the operation 1404) and use the resulting classifier 1408. This process allows the classifier 1408 to be generated without violating any classification access issues of the data. In fact, in this process, the high side data is never known by the low side entity, but the classifier was "trained" (generated based on) high side data.

Figure 23:
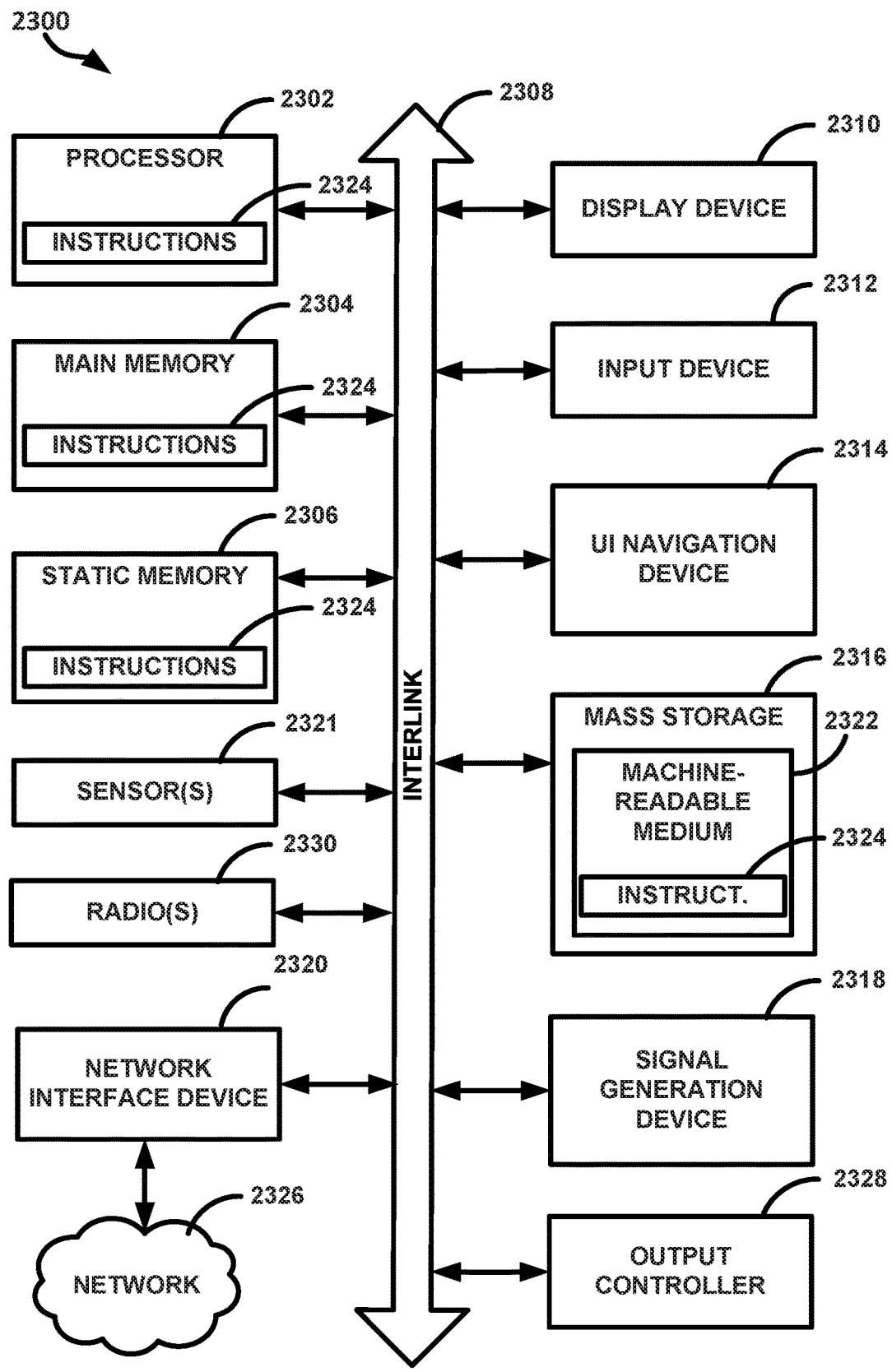
FIG. 23 illustrates, by way of example, a block diagram of an embodiment of a machine on which one or more of the methods, such as those discussed about FIGS. 1-22 can be implemented.

FIG. 23 illustrates, by way of example, a block diagram of an embodiment of a machine 2300 on which one or more of the methods, such as those discussed about FIGS. 1-22 can be implemented. In one or more embodiments, one or more items of the system 100, 400, 700, 1800 can be implemented by the machine 2300. In alternative embodiments, the machine 2300 operates as a standalone device or may be connected (e.g., networked) to other machines. In one or more embodiments, one or more items of the system 100, 400, 700, 1800 can include one or more of the items of the machine 2300.

In a networked deployment, the machine 2300 may operate in the capacity of a server or a client machine in server-client network environment, or as a peer machine in a peer-to-peer (or distributed) network environment. The machine 2300 may be a personal computer (PC), a tablet PC, a set-top box (STB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 2300 includes processing circuitry 2302 (e.g., a hardware processor, such as can include a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as RF or other electromagnetic, optical, audio, non-audible acoustic, or the like), sensors 2321 (e.g., a transducer that converts one form of energy (e.g., light, heat, electrical, mechanical, or other energy) to another form of energy), or the like, or a combination thereof), a main memory 2304 and a static memory 2306, which communicate with each other and all other elements of machine 2300 via a bus 2208. The transmit circuitry or receive circuitry can include one or more antennas, oscillators, modulators, regulators, amplifiers, demodulators, optical receivers or transmitters, acoustic receivers (e.g., microphones) or transmitters (e.g., speakers) or the like. The RF transmit circuitry can be configured to produce energy at a specified primary frequency to include a specified harmonic frequency.

The machine 2300 (e.g., computer system) may further include a video display unit 2310 (e.g., a liquid crystal display (LCD) or a cathode ray tube (CRT)). The machine 2300 also includes an alphanumeric input device 2312 (e.g., a keyboard), a user interface (UI) navigation device 2314 (e.g., a mouse), a disk drive or mass storage unit 2316, a signal generation device 2318 (e.g., a speaker) and a network interface device 2320.

The mass storage unit 2316 includes a machine-readable medium 2322 on which is stored one or more sets of instructions and data structures (e.g., software) 2324 embodying or utilized by any one or more of the methodologies or functions described herein. The instructions 2324 may also reside, completely or at least partially, within the main memory 2304 and/or within the processing circuitry 2302 during execution thereof by the machine 2300, the main memory 2304 and the processing circuitry 2302 also constituting machine-readable media. One or more of the main memory 2304, the mass storage unit 2316, or other memory device can store the data of the memory 116, 706, 708 for executing a method discussed herein.

The machine 2300 as illustrated includes an output controller 2328. The output controller 2328 manages data flow to/from the machine 2300. The output controller 2328 is sometimes called a device controller, with software that directly interacts with the output controller 2328 being called a device driver.

While the machine-readable medium 2322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 2324 may further be transmitted or received over a communications network 2326 using a transmission medium. The instructions 2324 may be transmitted using the network interface device 2320 and any one of several well-known transfer protocols (e.g., hypertext transfer protocol (HTTP), user datagram protocol (UDP), transmission control protocol (TCP)/internet protocol (IP)). The network 2326 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

EXAMPLES AND ADDITIONAL NOTES

Example 1 can include an apparatus comprising a memory including data indicating, for grids of cells, a cell size, a number of columns of cells, a number of rows of cells, key values for cells that have an input mapped thereto, and a class associated with each of the key values that have an input mapped thereto, processing circuitry coupled to the memory, the processing circuitry configured to identify a first key value of a first cell of a first grid of the grids of cells to which a first feature maps, cascade the first grid with a second grid of the grids of cells by embedding the first grid into each cell of the second grid, identify a second key value of a second cell of the second grid to which a second feature maps, the second key value representative of the first and second key values, compare the identified key value to the key values of the memory, in response to a determination the identified key value is in the memory, providing data indicating the class associated with the identified key value in the memory, and in response to a determination the identified key value is not in the memory, providing data indicating the input is an anomaly.

In Example 2, Example 1 can further include, wherein the processing circuitry is further configured to determine the cell size, the number of columns of cells, the number of rows of cells, and the key values of the grids of cells.

In Example 3, Example 2 can further include, wherein the processing circuitry is further configured to map other inputs including respective classes associated therewith to the first grid and resolve the first grid.

In Example 4, Example 3 can further include, wherein resolving the first grid includes increasing a resolution of a cell of the first grid by embedding a grid of sub-cells in the cell.

In Example 5, Example 4 can further include, wherein resolving the first grid includes increasing the resolution of the cell until a number of sub-cells of the cell with an input mapped thereto at a first iteration is the same as the number of sub-cells of the cell with an input thereto at a second, immediately subsequent iteration.

In Example 6, at least one of Examples 2-5 can further include, wherein the processing circuitry is further configured to deconflict the second grid.

In Example 7, Example 6 can further include, wherein deconflicting the second grid includes, if a cell of the cells of the second grid includes inputs mapped thereto increasing a resolution of the cell by embedding a grid of sub-cells in the cell.

In Example 8, Example 7 can further include, wherein deconflicting the SV grid further includes iteratively increasing the resolution of the second grid until all cells with multiple inputs mapped thereto include only a single class associated therewith.

Example 9 can include a method comprising identifying a first key value of a first cell of a first grid of grids of cells to which a first feature maps, cascading the first grid with a second grid of the grids of cells by embedding the first grid into each cell of the second grid, identifying a second key value of a second cell of the second grid to which a second feature maps, the second key value representative of the first and second key values, comparing the identified key value to the key values of a memory, in response to determining the identified key value is in the memory, providing data indicating a class associated with the identified key value in the memory, and in response to determining the identified key value is not in the memory, providing data indicating the input is an anomaly.

In Example 10, Example 9 can further include determining the cell size, the number of columns of cells, the number of rows of cells, and the key values of the grids of cells.

In Example 11, Example 10 can further include mapping other inputs including respective classes associated therewith to the first grid and resolving the first grid.

In Example 12, Example 11 can further include, wherein resolving the first grid includes increasing a resolution of a cell of the first grid by embedding a grid of sub-cells in the cell.

In Example 13, Example 12 can further include, wherein resolving the first grid includes increasing the resolution of the cell until a number of sub-cells of the cell with an input mapped thereto at a first iteration is the same as the number of sub-cells of the cell with an input thereto at a second, immediately subsequent iteration.

In Example 14, at least one of Examples 9-13 can further include deconflicting the second grid.

In Example 15, Example 14 can further include, wherein deconflicting the second grid includes, if a cell of the cells of the second grid includes inputs mapped thereto increasing a resolution of the cell by embedding a grid of sub-cells in the cell.

In Example 16, Example 15 can further include, wherein deconflicting the SV grid further includes iteratively increasing the resolution of the second grid until all cells with multiple inputs mapped thereto include only a single class associated therewith.

Example 17 includes at least one non-transitory machine-readable medium including instructions that, when executed by a machine, cause the machine to perform the method of at least one of Examples 9-16.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. An apparatus comprising:
a memory including data indicating, for grids of cells, a cell size, a number of columns of cells, a number of rows of cells, key values for cells that have an input mapped thereto, and a class associated with each of the key values that have an input mapped thereto;
processing circuitry coupled to the memory, the processing circuitry configured to:
identify a first key value of a first cell of a first grid of the grids of cells to which a first feature maps;
cascade the first grid with a second grid of the grids of cells by embedding the first grid into each cell of the second grid;
identify a second key value of a second cell of the second grid to which a second feature maps, the second key value representative of the first and second key values;
compare the identified second key value to the key values of the memory; and
in response to a determination the identified second key value is in the key values in the memory, provide data indicating the class associated with the identified second key value in the memory.

2. The apparatus of claim 1, wherein the processing circuitry is further configured to determine the cell size, the number of columns of cells, the number of rows of cells, and the key values of the grids of cells and in response to a determination the identified second key value is not in the memory, provide data indicating the input is an anomaly.

3. The apparatus of claim 2, wherein the processing circuitry is further configured to map other inputs including respective classes associated therewith to the first grid and resolve the first grid.

4. The apparatus of claim 3, wherein resolving the first grid includes increasing a resolution of a cell of the first grid by embedding a grid of sub-cells in the cell.

5. The apparatus of claim 4, wherein resolving the first grid includes increasing the resolution of the cell until a number of sub-cells of the cell with an input mapped thereto at a first iteration is the same as the number of sub-cells of the cell with an input mapped thereto at a second, immediately subsequent iteration.

6. The apparatus of claim 2, wherein the processing circuitry is further configured to deconflict the second grid.

7. The apparatus of claim 6, wherein deconflicting the second grid includes, if a cell of the cells of the second grid includes inputs of different classes mapped thereto, increasing a resolution of the cell by embedding a grid of sub-cells in the cell.

8. The apparatus of claim 7, wherein deconflicting the SV grid further includes iteratively increasing the resolution of the second grid until all cells with multiple inputs mapped thereto include only a single class associated therewith.

9. A method comprising:
identifying a first key value of a first cell of a first grid of grids of cells to which a first feature maps;
cascading the first grid with a second grid of the grids of cells by embedding the first grid into each cell of the second grid;
identifying a second key value of a second cell of the second grid to which a second feature maps, the second key value representative of the first and second key values;
comparing the identified second key value to key values in a memory;
in response to determining the identified second key value is in the key values the memory, providing data indicating a class associated with the identified second key value in the memory.

10. The method of claim 9, further comprising determining the cell size, the number of columns of cells, the number of rows of cells, and the key values of the grids of cells and in response to a determination the identified second key value is not in the memory, providing data indicating the input is an anomaly.

11. The method of claim 10, further comprising mapping other inputs including respective classes associated therewith to the first grid and resolving the first grid.

12. The method of claim 11, wherein resolving the first grid includes increasing a resolution of a cell of the first grid by embedding a grid of sub-cells in the cell.

13. The method of claim 12, wherein resolving the first grid includes increasing the resolution of the cell until a number of sub-cells of the cell with an input mapped thereto at a first iteration is the same as the number of sub-cells of the cell with an input mapped thereto at a second, immediately subsequent iteration.

14. The method of claim 9, further comprising deconflicting the second grid.

15. The method of claim 14, wherein deconflicting the second grid includes, if a cell of the cells of the second grid includes inputs mapped thereto increasing a resolution of the cell by embedding a grid of sub-cells in the cell.

16. The method of claim 15, wherein deconflicting the SV grid further includes iteratively increasing the resolution of the second grid until all cells with multiple inputs mapped thereto include only a single class associated therewith.

17. At least one non-transitory machine-readable medium including instructions that, when executed by a machine, cause the machine to perform operations comprising:
- identifying a first key value of a first cell of a first grid of grids of cells to which a first feature maps,
- cascading the first grid with a second grid of the grids of cells by embedding the first grid into each cell of the second grid;
- identifying a second key value of a second cell of the second grid to which a second feature maps, the second key value representative of the first and second key values;
- comparing the identified second key value to key values in a memory; and
- in response to determining the identified second key value is in the key values in the memory, providing data indicating a class associated with the identified second key value in the memory.

18. The non-transitory machine-readable medium of claim 17, wherein the operations further comprise mapping other inputs including respective classes associated therewith to the first grid and resolving the first grid.

19. The method of claim 11, wherein resolving the first grid includes iteratively increasing a resolution of a cell until a number of sub-cells of the cell with an input mapped thereto at a first iteration is the same as the number of sub-cells of the cell with an input thereto at a second, immediately subsequent iteration.

20. The non-transitory machine-readable medium of claim 19, further comprising deconflicting the second grid by iteratively increasing a resolution of the cell by embedding a grid of sub-cells in the cell the resolution of the second grid until all cells with multiple inputs mapped thereto include only a single class associated therewith.

* * * * *